(12) United States Patent
Ajitomi et al.

(10) Patent No.: US 9,122,544 B2
(45) Date of Patent: Sep. 1, 2015

(54) INFORMATION PROCESSING APPARATUS, RESOURCE PROVIDING APPARATUS, AND INFORMATION PROCESSING SYSTEM

(75) Inventors: Daisuke Ajitomi, Tokyo (JP); Kotaro Ise, Kawasaki (JP); Hiroyuki Aizu, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 13/529,330

(22) Filed: Jun. 21, 2012

(65) Prior Publication Data
US 2013/0047216 A1 Feb. 21, 2013

(30) Foreign Application Priority Data
Aug. 15, 2011 (JP) ................................. 2011-177660

(51) Int. Cl.
G06F 15/16 (2006.01)
G06F 9/54 (2006.01)
H04L 29/08 (2006.01)
(Continued)

(52) U.S. Cl.
CPC ............. *G06F 9/541* (2013.01); *G06F 21/305* (2013.01); *H04L 67/2823* (2013.01); *H04L 63/083* (2013.01); *H04L 63/108* (2013.01)

(58) Field of Classification Search
USPC ......................................................... 709/246
See application file for complete search history.

(56) References Cited

U.S. PATENT DOCUMENTS 7,852,860 B2 * 12/2010 Aizu et al. .................... 370/401
2002/0083143 A1 * 6/2002 Cheng .......................... 709/208
2004/0246992 A1 * 12/2004 Henry et al. .................. 370/467
(Continued)

FOREIGN PATENT DOCUMENTS

JP 2005-102060 A 4/2005
JP 2007-188184 A 7/2007
(Continued)

OTHER PUBLICATIONS

Zeadally, Internet Access to Heterogeneous Home Area Network Devices with an OSGi-based REsidential Gateway, 2008, Retrieved from the Internet <URL: citeseerx.ist.psu.edu/viewdoc/download-?doi=10.1.1.103.4186&rep=rep1&type=pdf>, pp. 1-8 as printed.*
(Continued)

*Primary Examiner* — Michael Chao
(74) *Attorney, Agent, or Firm* — Oblon,, McClelland, Maier & Neustadt, L.L.P.

(57) ABSTRACT

There is provided an information processing apparatus which the communication unit receives a usage request of a resource described in a first format from a program providing apparatus, the conversion unit identifies a resource providing apparatus having the resource as indicated and converts the usage request described in the first format into the usage request described in a second format that can be interpreted by the resource providing apparatus identified, the communication unit transmits the usage request described in the second format to the resource providing apparatus and receives a processing result of the usage request described in the second format from the resource providing apparatus, the conversion unit converts the processing result described in the second format into the processing result described in the first format, and the program execution unit performs an operation according to the processing result described in the first format.

21 Claims, 20 Drawing Sheets

(51) Int. Cl.
*G06F 21/30* (2013.01)
*H04L 29/06* (2006.01)

(56) References Cited

U.S. PATENT DOCUMENTS

| | | | |
|---|---|---|---|
| 2006/0075269 A1* | 4/2006 | Liong et al. | 713/300 |
| 2007/0174282 A1 | 7/2007 | Matsuda et al. | |
| 2008/0172411 A1 | 7/2008 | Kikuchi et al. | |
| 2011/0251807 A1* | 10/2011 | Rada et al. | 702/61 |
| 2012/0209523 A1 | 8/2012 | Nara et al. | |
| 2012/0291119 A1* | 11/2012 | Boeckner et al. | 726/17 |

FOREIGN PATENT DOCUMENTS

| | | | |
|---|---|---|---|
| JP | 2008-171278 A | 7/2008 | |
| JP | 2009-71728 A | 4/2009 | |
| JP | 2011-33446 A | 2/2011 | |

OTHER PUBLICATIONS

No stated author, UPNP Device Architecture v1.0, 2006, Retrieved from the Internet <URL: .upnp.org/specs/arch/upnp-arch-devicearchitecture-v1.0-20060720.pdf>, pp. 1-80 as printed.*

No stated author; Windows ME—Understanding UPnP; Microsoft; Jun. 2000; Retrieved from the Internet <URL: upnp.org/download/UPNP_understandingUPNP.doc>; pp. 1-45 as printed.*

"Setup: Discovery and Connection of Remote UI Devices", CEA Standard (CEA-2014-A), Sec. 5.1, Jul. 2007, 8 pages.

Chinese Office Action issued Sep. 19, 2014, in China Patent Application No. 201210224351.1 (with English translation).

Office Action issued Jun. 6, 2014 in Japanese Patent Application No. 2011-177660 (with English language translation).

Chinese Office Action dated May 29, 2015, issued in Chinese Patent Application No. 20121022435.1 (with English translation).

* cited by examiner

| COLUMN NAME | DATA ATTRIBUTE | DATA EXAMPLE IN FIRST EMBODIMENT |
|---|---|---|
| DEVICE IDENTIFIER | MAIN KEY | http://npvr.service.com |
| COMMON API IDENTIFIER | MAIN KEY | PVRDevice.reserve |
| DEVICE-DEPENDENT API LOCATION | BEFORE CONVERSION (COMMON API) | http://npvr.service.com/webapi/reserve |
| COMMON API ⇒ DEVICE-DEPENDENT API CONVERSION RULE (REQUEST) | AFTER CONVERSION (DEVICE-DEPENDENT API) | PVRDevice.record( $1, $2, $3, $4 ) |
| DEVICE-DEPENDENT API ⇒ COMMON API CONVERSION RULE (RESPONSE) | BEFORE CONVERSION (DEVICE-DEPENDENT API) | http://npvr.service.com/webapi/record?netw ork=$1&service=$2&transport=$3&event=$4 <br> <?xml version="1.0" encoding="utf-8" ?> <br> <npvr:response> <br>   <npvr:code> $1 </npvr:code> <br>   <npvr:message> $2 </npvr:message> <br> </npvr:response> |
| | AFTER CONVERSION (COMMON API) | { <br>   "responseCode": $1, <br>   "responseMessage": $2 <br> } |

FIG.5

| COLUMN NAME | DATA ATTRIBUTE | DATA EXAMPLE IN SECOND EMBODIMENT | |
|---|---|---|---|
| | | RESOURCE PROVIDING APPARATUS 104 | RESOURCE PROVIDING APPARATUS 105 |
| DEVICE IDENTIFIER | MAIN KEY | uuid:2e70131e-1999-47ff-9ba6-c907ca101dd1 | uuid:61c0594f-d79f-4c34-9a7b-3523e2850ad2 |
| COMMON API IDENTIFIER | MAIN KEY | PVRDevice.reserve | PVRDevice.reserve |
| DEVICE NAME | | Digital TV-XYZ | HDD Recorder-ABC |
| DEVICE-DEPENDENT API LOCATION | | http://192.168.0.10:8888/upnp/control/pvr-srs-ctrl | http://192.168.0.20:8888/upnp/control/pvr-srs-ctrl |
| COMMON API ⇒ DEVICE-DEPENDENT API CONVERSION RULE (REQUEST) | ※BEFORE CONVERSION (COMMON API) | PVRDevice.record( $1, $2, $3, $4) | PVRDevice.record( $1, $2, $3, $4) |
| | ※AFTER CONVERSION (DEVICE-DEPENDENT API) | `<?xml version="1.0" encoding="utf-8" ?>`<br>`<request type="reserve">`<br>`  <network_id>$1</network_id>`<br>`  <service_id>$2</service_id>`<br>`  <transport_id>$3</transport_id>`<br>`  <event_id>$4</event_id>`<br>`</request>` | `<?xml version="1.0" encoding="utf-8" ?>`<br>`<request type="reserve">`<br>`  <network_id>$1</network_id>`<br>`  <service_id>$2</service_id>`<br>`  <transport_id>$3</transport_id>`<br>`  <event_id>$4</event_id>`<br>`</request>` |
| DEVICE-DEPENDENT API ⇒ COMMON API CONVERSION RULE (RESPONSE) | ※BEFORE CONVERSION (DEVICE-DEPENDENT API) | `<?xml version="1.0" encoding="utf-8" ?>`<br>`<response>`<br>`  <code>$1</code>`<br>`  <message>$2</message>`<br>`</response>` | `<?xml version="1.0" encoding="utf-8" ?>`<br>`<response>`<br>`  <code>$1</code>`<br>`  <message>$2</message>`<br>`</response>` |
| | ※AFTER CONVERSION (COMMON API) | { "responseCode": $1,<br>  "responseMessage": $2 } | { "responseCode": $1,<br>  "responseMessage": $2 } |
| NECESSITY OR NOT OF USER APPROVAL | | True | –<UNREGISTERED> |
| DATE AND TIME OF USER APPROVAL | | 2010-12-12 T 00:00:01+9:00 | –<UNREGISTERED> |
| RESULT OF USER APPROVAL | | OK | –<UNREGISTERED> |
| VALIDITY PERIOD OF USER APPROVAL | ※IN SECONDS | 3600 | –<UNREGISTERED> |

FIG.6

| COLUMN NAME | DATA ATTRIBUTE | DATA EXAMPLE IN THIRD EMBODIMENT | |
| --- | --- | --- | --- |
| | | RESOURCE PROVIDING APPARATUS 104 | RESOURCE PROVIDING APPARATUS 105 |
| DEVICE IDENTIFIER | MAIN KEY | uuid:2e70131e-1999-47ff-9ba6-c907ca101dd1 | uuid:61c0594f-d79f-4c34-9a7b-3523e2850ad2 |
| MAC ADDRESS OF DEVICE | | 99:00:11:22:33:44 | 00:11:22:33:44:55 |
| COMMON API IDENTIFIER | MAIN KEY | PVRDevice.reserve | PVRDevice.reserve |
| DEVICE NAME | | Digital TV-XYZ | HDD Recorder-ABC |
| DEVICE-DEPENDENT API LOCATION | | http://192.168.0.10:8888/upnp/control/pvr-srs-ctrl | http://192.168.0.20:8888/upnp/control/pvr-srs-ctrl |
| PROTOCOL TYPE | | DLNA/1.0 | DLNA/1.0 |
| COMMON API ⇒ DEVICE-DEPENDENT API CONVERSION RULE (REQUEST) | ※ BEFORE CONVERSION (COMMON API) | PVRDevice.record( $1, $2, $3, $4 ) | PVRDevice.record( $1, $2, $3, $4 ) |
| | ※ AFTER CONVERSION (DEVICE-DEPENDENT API) | `<?xml version="1.0" encoding="utf-8" ?>`<br>`<request type="reserve">`<br>  `<network_id> $1 </network_id>`<br>  `<service_id> $2 </service_id>`<br>  `<transport_id> $3 </transport_id>`<br>  `<event_id> $4 </event_id>`<br>`</request>` | `<?xml version="1.0" encoding="utf-8" ?>`<br>`<request type="reserve">`<br>  `<network_id> $1 </network_id>`<br>  `<service_id> $2 </service_id>`<br>  `<transport_id> $3 </transport_id>`<br>  `<event_id> $4 </event_id>`<br>`</request>` |
| DEVICE-DEPENDENT API ⇒ COMMON API CONVERSION RULE (RESPONSE) | ※ BEFORE CONVERSION (DEVICE-DEPENDENT API) | `<?xml version="1.0" encoding="utf-8" ?>`<br>`<response>`<br>  `<code> $1 </code>`<br>  `<message> $2 </message>`<br>`</response>` | `<?xml version="1.0" encoding="utf-8" ?>`<br>`<response>`<br>  `<code> $1 </code>`<br>  `<message> $2 </message>`<br>`</response>` |
| | ※ AFTER CONVERSION (COMMON API) | { "responseCode" : $1,<br>  "responseMessage" : $2<br>} | { "responseCode" : $1,<br>  "responseMessage" : $2<br>} |

FIG.7A

| NECESSITY OR NOT OF USER APPROVAL | True | --<UNREGISTERED> |
|---|---|---|
| DATE AND TIME OF USER APPROVAL | 2010-12-12 T 00:00:01+9:00 | --<UNREGISTERED> |
| RESULT OF USER APPROVAL | OK | --<UNREGISTERED> |
| VALIDITY PERIOD OF USER APPROVAL ※IN SECONDS | 3600 | --<UNREGISTERED> |
| ACCESS AUTHENTICATION/ PERMISSION METHOD INFORMATION | Basic Authentication | Digest Authentication |
| TICKET INFORMATION | ab010203de | Fg030406hi |
| TICKET VALIDITY PERIOD | 2010-12-19T00:00:01+9:00 | 2010-12-19T00:00:01+9:00 |

DATA EXAMPLE IN FOURTH EMBODIMENT

| COLUMN NAME | DATA ATTRIBUTE | RESOURCE PROVIDING APPARATUS 104 | RESOURCE PROVIDING APPARATUS 105 |
|---|---|---|---|
| DEVICE IDENTIFIER | MAIN KEY | uuid:2e70131e-1999-47ff-9ba6-c907ca101dd1 | uuid:61c05946-d79f-4c34-9a7b-3523e2850ad2 |
| MAC ADDRESS OF DEVICE | | 99:00:11:22:33:44 | 00:11:22:33:44:55 |
| COMMON API IDENTIFIER | MAIN KEY | PVRDevice.reserve | PVRDevice.reserve |
| DEVICE NAME | | Digital TV-XYZ | HDD Recorder-ABC |
| DEVICE-DEPENDENT API LOCATION | | http://192.168.0.10:8888/upnp/control/pvr-srs-ctrl | http://192.168.0.20:8888/upnp/control/pvr-srs-ctrl |
| COMMON API⇒DEVICE-DEPENDENT API | ※CHANGED (COMMON API) | http://192.168.0.10:8888/upnp/control/pvr-srs-ctrl-is/transcode.is | http://192.168.0.20:8888/upnp/control/pvr-srs-ctrl-is/transcode.is |
| LOCATION OF CONVERSION PROGRAM | | | |
| NECESSITY OR NOT OF USER APPROVAL | | True | --<UNREGISTERED> |
| DATE AND TIME OF USER APPROVAL | | 2010-12-12 T 00:00:01+9:00 | --<UNREGISTERED> |
| RESULT OF USER APPROVAL | | OK | --<UNREGISTERED> |
| VALIDITY PERIOD OF USER APPROVAL | IN SECONDS | 3600 | --<UNREGISTERED> |
| ACCESS AUTHENTICATION/ PERMISSION METHOD INFORMATION | | OAuth/2.0 | Basic Authentication |
| LICENSE INFORMATION CLIENT IDENTIFIER | | alice001 | --<UNREGISTERED> |
| LICENSE INFORMATION SECRET KEY | | Asdfpruboi34134u43urweijrfa32ls | --<UNREGISTERED> |
| TICKET INFORMATION | | ab010203de | Fg030406hi |
| VALIDITY PERIOD OF ACCESS PERMISSION | | 2010-12-19T00:00:01+9:00 | 2010-12-19T00:00:01+9:00 |

| COLUMN NAME | DATA ATTRIBUTE | DATA EXAMPLE IN FIRST EMBODIMENT |
|---|---|---|
| ACCESS REQUEST SOURCE IDENTIFIER | MAIN KEY | http://www.iepg.com/ |
| ACCESS TARGET RESOURCE IDENTIFIER | MAIN KEY | /upnp/control/pvr-srs-ctrl |
| USER IDENTIFIER | MAIN KEY | alice001 |
| ACCESS PERMISSION / REFUSAL INFORMATION | | <NOT YET SET> |
| USER APPROVAL RESULT | | NG |
| PERMISSION INFORMATION | | ab010203de |
| PERMISSION VALIDITY PERIOD | | 2010-12-25T00:00:00+9:00 |

FIG.9

```
1   <!DOCTYPE html PUBLIC "-//W3C//DTD XHTML 1.0 Transitional//EN"
2   "http://www.w3.org/TR/xhtml1/DTD/xhtml1-transitional.dtd">
3   <html xmlns="http://www.w3.org/1999/xhtml">
4   <head>
5     <!--……-->
6     <!--CALL OF RESOURCE USAGE PROGRAM OF PROGRAM PROVIDING APPARATUS-->
7     <script src="http://www.iepg.com/useResource.js">
8     <!--CALL OF RESOURCE USAGE LIBRARY PROVIDED BY CONVERSION
          UNIT OF INFORMATION PROCESSING APPARATUS-->
9     <script src="http://localhost/deviceApi.js"/>
10  </head>
11  <body>
12    <!--OMISSION: Web CONTENTS(ELECTRONIC PROGRAM
         GUIDE SERVICE) OF PROGRAM PROVIDING APPARATUS-->
    </body>
    </html>
```

FIG.10

```
1  function PVRDevice.prototype.reserve($1, $2, $3, $4, onFinished($5, $6))
2  {
3      // ACQUIRE DEVICE INFORMATION
4      var device_id=PVRDevice.prototype.prepare();
5
6      // DYNAMICALLY LOAD CONVERSION CODE
7      var transcodeFile=document.createElement("script");
8      if(device_id=="uuid:2e70131e-1999-47ff-9ba6-c907ca101dd1") {
9          // IN THE CASE OF RESOURCE PROVIDING APPARATUS 104
10         transcodeFile.setAttribute("src", "http://192.168.0.10:8888/upnp/control/pvr-srs-ctrl-js/transcode.js");
11     }
12     else if(device_id=="uuid:61c0594f-d79f-4c34-9a7b-3523e2850ad") {
13         // IN THE CASE OF RESOURCE PROVIDING APPARATUS 105
14         transcodeFile.setAttribute("src", "http://192.168.0.20:8888/upnp/control/pvr-srs-ctrl-js/transcode.js");
15     }
16     document.getElementsByTagName("head")[0].appendChild(transcodeFile);
17
18     // CALL CONVERSION CODE FOR EACH DEVICE
19     return PVRDevice.prototype.inner_reserve($1, $2, $3, $4, onFinished);
20 }
```

FIG.11

```
1   function PVRDevice.prototype.inner_reserve($1,$2,$3,$4,onFinished($5,$6))
2   {
3     var request=new XMLHttpRequest();
4
5     // CONVERSION OF REQUEST(IN THIS EXAMPLE, URL QUERY IS USED FOR SIMPLICITY)
6     var url="http://192.168.0.10:8888/upnp/control/pvr-srs-ctrl?network_id="+$1
7       +"&service_id="+$2+"&transport_id="+$3+"event_id="+$4;
8
9     // CONNECT RESOURCE PROVIDING APPARATUS TO DEVICE-DEPENDENT API
10    request.open("GET",url,true);
11
12    // REGISTER PROCESS AFTER RECEIVING RESPONSE FROM DEVICE-DEPENDENT API
13    request.onreadystatechange=function(){
14
15      // PROCESS WHEN RESOURCE IS USED SUCCESSFULLY
16      if(request.state=200) {
17
18        // PARSE XML DATA OF RESPONSE(ASSUMING RESPONSE XML BEFORE CONVERSION IN FIG. 13)
19        var xml=parseXML(request.responseText);
20
21        // TRANSMIT RESPONSE ITEMS TO CALLER(RESPONSE CONVERSION)
22        onFinish(xml.response.code, xml.response.message);
23        return;
24      }
25      // PROCESS WHEN ERROR OCCURS(OMISSION)
26      return;
27    }
28
29    // TRANSMIT REQUEST
30    reuuest.send(null);
31  }
```

FIG.12

INFORMATION PROCESSING APPARATUS, RESOURCE PROVIDING APPARATUS, AND INFORMATION PROCESSING SYSTEM

CROSS REFERENCE TO RELATED APPLICATIONS

This application is based upon and claims the benefit of priority from the prior Japanese Patent Application No. 2011-177660, filed on Aug. 15, 2011, the entire contents of which are incorporated herein by reference.

FIELD

Embodiments described herein relate to an information processing apparatus, a resource providing apparatus, and an information processing system.

BACKGROUND

W3C Device API is a technique for accessing an internal resource (function or information) of a terminal, such as PC and smartphone, via a Web page on a site operated by a service provider. A typical example is Geolocation API that accesses GPS information in a smartphone to make it possible to provide services based on locational information. As an example of the Device API technique (here, indicates a technique that uses an internal function of a terminal, which basically cannot be used from a Web page), a technique is known in which UPnP function that realizes Plug and Play of a rooter and an AV device on a home network is used from a Web page. When this technique is used, it is possible to realize mash-up (cooperation) of a Web page provided by a service provider and a home appliance resource on a home network.

A Web browser acquires components included in Web contents from a site on a network and displays the Web contents. In this case, an optimization method is known in which only the data to be displayed is acquired from a server and layout information and templates of static image data are previously cached.

However, when the technique described above is used, the service provider directly accesses devices on a home network (via a Web page), so that there are some problems.

First, the service has to know the presence of a device to be accessed (a resource providing apparatus). In other words, a device including Web browser, such as a PC and a smartphone, has to disclose device information on the home network to the service.

Second, the service has to use access methods that may be different for each device on the home network.

The above problems will be described with reference to a specific example. For example, a case is considered in which a service provider operates an electronic program guide service on the Internet. It is assumed that a "recording reservation button" is set in each program field in the displayed electronic program guide on a Web page of the electronic program guide service and when a user displays the electronic program guide service on a Web browser in a home PC and presses the "recording reservation button", the user can make a recording reservation of the program on a digital TV in home.

At this time, when realizing this use case by the technique described above, a program (JavaScript script code) embedded in the Web page of the electronic program guide service directly uses a function of DLNA (Digital Living Network Alliance) from the Web page. Therefore, the presence of the digital TV on the home network on which the PC is installed is detected by DLNA Discovery, detailed information of the detected digital TV is directly acquired from the digital TV by DLNA Description, and a DLNA Action command for the recoding reservation is transmitted, so that the recording reservation from the Web page is realized.

However, in the series of sequences, the program provided by the service provider can easily acquire a list of devices located on user's home network and detailed information of the devices. In other words, if a logic that the program uploads acquired information to a server of the service provider is embedded, personal information (what devices the user has, and the like) is leaked to the service provider.

Further, if devices that use other protocols such as ECHONET in addition to DLNA are to be operated, the above-described program has to include codes compatible with a plurality of protocols. In particular, the types of devices present on home networks are unknown, so that the service provider has to handle all transmission protocols and further all authentication/permission methods that may be supported by the devices. Thus, the service provider has to spend high development costs.

As described above, in the conventional art, there is a problem that the service provider has to know the presence of the devices to be accessed.

BRIEF DESCRIPTION OF THE DRAWINGS

FIG. 5 is a diagram showing an example of a data structure of a device information storage according to the first embodiment;

FIG. 6 is a diagram showing an example of a data structure of a device information storage according to the second embodiment;

FIG. 7A is a diagram showing an example of a data structure of a device information storage according to the third embodiment;

FIG. 7B is a diagram following FIG. 7A.

FIG. 8 is a diagram showing an example of a data structure of a device information storage according to the fourth embodiment;

FIG. 9 is a diagram showing an example of a data structure of an access request source information storage according to the fourth embodiment;

FIG. 10 is a diagram showing an outline of a program provided by a program providing apparatus according to the fourth embodiment;

FIG. 11 is a diagram showing an example of a library that defines a resource usage API provided by a conversion unit according to the fourth embodiment;

FIG. 12 is a diagram showing an example of a conversion program provided by a resource providing apparatus according to the fourth embodiment;

DETAILED DESCRIPTION

According to an embodiment, there is an information processing apparatus including: a communication unit, a program execution unit and a conversion unit.

The communication unit communicates with a program providing apparatus and a resource providing apparatus and receives a usage request of a resource described in a first format from the program providing apparatus.

The conversion unit identifies a resource providing apparatus having the resource indicated by the usage request and converts the usage request described in the first format into the usage request described in a second format that can be interpreted by the resource providing apparatus identified.

The communication unit transmits the usage request described in the second format to the resource providing apparatus identified by the conversion unit and receives a processing result of the usage request described in the second format from the resource providing apparatus.

The conversion unit converts the processing result described in the second format into the processing result described in the first format.

The program execution unit performs an operation according to the processing result described in the first format.

Hereinafter, embodiments will be described with reference to accompanying drawings.

First Embodiment

An assumed specific use case will be described as an outline of the present embodiment.

First, a user browses a Web page of a service (the electronic program guide service described above) on the Internet and presses a "record button" of a program field of which the user wants to make a recording reservation. When the button is pressed, JavaScript code embedded in the Web page being browsed is executed and "recording reservation function at PC peripheral AV device" is called as an internal function of a PC. As an internal process in the PC, actually, an NPVR (Network Personal Video Recorder) (network recording reservation) cloud service on the Internet is used and a specified program is recorded on the cloud service.

In the use case described above, the PC is an information processing apparatus according to the present embodiment, the electronic program guide service is a program providing apparatus, and the NPVR service is a resource providing apparatus. Hereinafter, the details of the present embodiment will be described.

Figure 1:
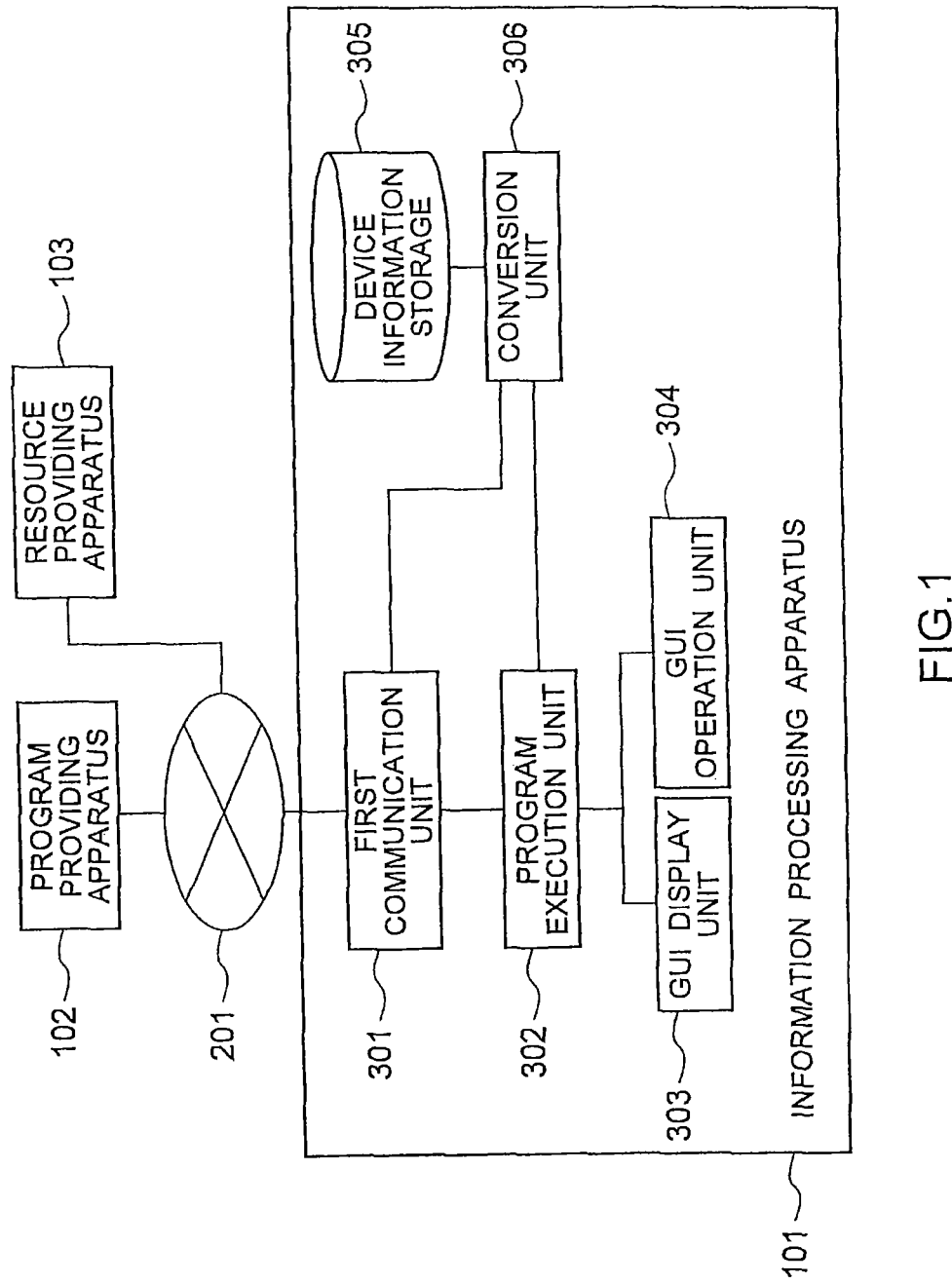
FIG. 1 is a block diagram showing a configuration of a system according to a first embodiment.

FIG. 1 is a system configuration diagram showing functional blocks of an information processing apparatus according to a first embodiment. The system according to the first embodiment includes an information processing apparatus 101, a program providing apparatus 102, and a resource providing apparatus 103. The information processing apparatus 101, the program providing apparatus 102, and the resource providing apparatus 103 are connected to each other via a network 201.

Next, the network and apparatuses included in the system of the present embodiment will be described.

The network 201 is the Internet or an IP (Internet. Protocol) network such as NGN (Next Generation Network) which is a quality-guaranteed closed network. In the present embodiment, the network 201 is assumed to be the Internet.

The information processing apparatus 101 has a normal computer hardware configuration including a CPU, a main storage, an auxiliary storage, and I/O interfaces such as a display and keyboard. Specifically, the information processing apparatus 101 is a PC, a smartphone, a slate device, or the like. In the present embodiment, the information processing apparatus 101 is assumed to be a laptop PC.

The program providing apparatus (an access request source or access requestor) 102 also has a normal computer hardware configuration in the same manner as the information processing apparatus 101. Specifically, the program providing apparatus 102 is a digital home appliance, a PC, or a server apparatus. In the present embodiment, the program providing apparatus 102 is a server apparatus used in a data center or the like. The program providing apparatus 102 provides Web services (sites) on the Internet. Specifically, it is assumed that the program providing apparatus 102 provides the electronic program guide service described above. It is assumed that this service can make a recording reservation on a device (or an external service) on which a recording reservation can be made and which is owned by a user who browses an electronic program guide.

The program provided by the program providing apparatus 102 is a JavaScript program embedded in an HTML (Hyper Text Markup Language) document. Or, the program may be Flash contents. The program is not limited to existing web contents and may be a program based on another markup language such as XML and BML (Broadcast Markup Language) and a program description language other than JavaScript. In the present embodiment, the program is assumed to be a JavaScript program.

The resource providing apparatus 103 also has a normal computer hardware configuration in the same manner as the program providing apparatus 102. Specifically, the resource providing apparatus 103 is a PC or a server apparatus. In the present embodiment, the resource providing apparatus 103 is a server apparatus used in a data center or the like. The resource providing apparatus 103 provides NPVR services on the Internet. The NPVR service is assumed to be a service in which a member user of the service can make a recording reservation of a TV program into a storage on the server.

The resource provided by the resource providing apparatus 103 is assumed to be functions and information in an apparatus. The resource is accessed via an API (Application Programming Interface) which the resource providing apparatus 103 makes public to the outside of the apparatus. In the present embodiment, the resource is provided via Web API made public on the Internet.

Next, various functions realized when the CPU of the information processing apparatus 101 executes various programs stored in the main storage and the auxiliary storage will be described with reference to FIG. 1. The information processing apparatus 101 includes a first communication unit 301, a program execution unit 302, a GUI display unit 303, a GUI operation unit 304, a device information storage 305, and a conversion unit 306. These units are generated on the main storage such as a RAM when the CPU executes a program. The execution program of the CPU is stored in a recording medium such as a hard disk and a CD-ROM. The execution program is read from the recording medium and developed on the main storage. The execution program may be downloaded to the information processing apparatus 101 via a network such as the Internet.

Among these units, the device information storage 305 is a database management system. This may be a relational database or may be an XML (eXtensible Markup Language) database. The device information storage 305 need not be constructed by a single database management system, but may use a plurality of database management systems in parallel. The device information storage 305 may be constructed on a single physical storage or may be a database management system configured by a plurality of physical auxiliary storages such as NAS (Network Attached Storage) and SAN (Storage Area Network). A data storage area may be non-volatile or volatile. If the device information storage 305 has a means that can obtain an information unit (entry) of data stored in each storage, the device information storage 305 may be a simple data management module based on a list structure generated on the main storage when the CPU executes a program, may be a management module of a CSV format file, or may include a Key/Value store.

Hereinafter, each unit will be described.

The first communication unit 301 communicates with the program providing apparatus 102 and the resource providing apparatus 103 on a first network. The first communication unit 301 receives a request from the program execution unit 302, transmits a request of Web contents such as an HTML document including a program to the program providing apparatus 102, and receives the Web contents (the Web contents may be contents of other formats as described above). The first communication unit 301 transmits a resource usage request inputted from the conversion unit 306 to the resource providing apparatus 103 and receives a processing result of the resource providing apparatus 103. A communication protocol with the program providing apparatus 102 and the resource providing apparatus 103 may be based on a TCP protocol such as HTTP and FTP or may be based on a UDP protocol such as RTP and FLUTE. The communication protocol is not limited to a specific protocol. In the present embodiment, the first communication unit 301 is an HTTP client communicating with the program providing apparatus 102 and the resource providing apparatus 103 by HTTP(S).

The program execution unit 302 processes the Web contents including a program received from the program providing apparatus 102. The program execution unit 302 inputs a resource usage request embedded in the program to the conversion unit 306. The format of the resource usage request corresponds to a first format. In the present embodiment and all the embodiments described later, the program execution unit 302 is a Web browser engine. However, the program execution unit 302 is not limited to a Web browser, but may be a BML browser or another application platform including an execution environment of the program. When the program execution unit 302 is a Web browser, the resource usage request is a JavaScript API call that realizes an access to an internal resource in the information processing apparatus 101 or a message transmission using a communication API that can be called from a Web browser such as AJAX and Web-Socket. In the present embodiment, the resource usage request is assumed to be realized as a JavaScript API call. In the present embodiment, it is assumed that, for example, the JavaScript API (PVRDevice.reserve) as described below is called as the JavaScript program called when the "recording reservation button" is pressed.

```
...
var anonymousDevice = new PVRDevice( );
if (anonymousDevice) {
    var network_id = 1, servive_id = 2, transport_stream_id = 3, event_id= 456;
    var result = anonymousDevice.reserve(network_id, service_id, transport_stream_id, event_id);
    ...
}
...
```

The parameters included in this function are a set of identification information that specifies a TV program. The program execution unit 302 outputs identification information of the API (an API name (PVRDevice.reserve) and the like as the API identification information) and parameter information (network_id, service_id, transport_stream_id, and event_id) to the conversion unit described later.

The GUI display unit 303 performs rendering to the display included in the information processing apparatus 101 by a command from the program execution unit 302. When the GUI display unit 303 needs selection/acceptance of a user, the GUI display unit 303 displays an interface of selection/acceptance (pop-up screen or the like) according to a request from the conversion unit 306 via the program execution unit 302.

The GUI operation unit 304 outputs an operation signal inputted via a keyboard, a mouse, or a touch panel included in the information processing apparatus 101 to the program execution unit 302. The program execution unit 302 converts the operation signal into a selection/acceptance result of the user (this is a function of the Web browser).

The device information storage 305 stores information of the resource providing apparatus 103 as device information. The device information may be inputted by the user via the GUI of the information processing apparatus 101. When the service is not a service on a home network, but a service on the Internet as in the present embodiment, the device information may be preset in the apparatus or may be accumulated in the information processing apparatus when joining and registering in the service. FIG. 5 shows an example of a data structure according to the present embodiment. As shown in FIG. 5, the device information includes a device identifier, a common API identifier, a location of a device-dependent API, conversion rule information (conversion mechanism) to a device-dependent API. Here, these attributes included in the device information will be described.

First, the device identifier is information for identifying a device, that is, the resource providing apparatus. The device identifier may be information having any format, which can uniquely identify the resource providing apparatus, such as a URI (Universal Resource Identifier), a UUID (Universal Unique Identifier), a MAC (Media Access Control) address, a combination of a type name and a production number of the device, and an IPv6 address. In the present embodiment, the device identifier is a URI that specifies the device (an NPVR service in the present embodiment).

The common API identifier is information for identifying the JavaScript API through which the program providing apparatus sends a resource usage request. The API is premised on that the information processing apparatus 101 and the program providing apparatus 102 share a common specification. Therefore, it is assumed that the API specification is standardized or a manufacturer of the information processing apparatus, which accesses the resource providing apparatus by proxy, defines a proprietary API specification and makes the specification public. Under this assumption, the API identifier may be information having any format if the information processing apparatus 101 can uniquely identify each common API by the information. If the API is an open proprietary API of a device manufacturer, a unique number is given to the open API and the number may be used as the API identifier. In the present embodiment, a method character string (class name.method name) of an API is used as the API identifier (PVRDevice.reserve as a recording reservation function of a device having a recording reservation function).

The device-dependent API location is information that indicates a location of an individual API of the resource providing apparatus corresponding to the common API described above. The device-dependent API location may have a different format for each resource providing apparatus. In the present embodiment, the device-dependent API location is a URI (http://npvr.service.com/webapi/reserve) indicating a Web API provided by the NPVR service.

The conversion rule to a device-dependent API is information for converting a resource usage request (first format) using a common API into an actual resource usage request (second format) of each device-dependent API. The conversion rule to a device-dependent API is used by the conversion unit 306. The conversion rule information may include, for example, sequence information of arguments, correspondence table information of argument formats, and correspondence table information of return value information formats and error codes, or may be an implementation of the common API itself internally converted into a device-dependent API call. The conversion rule information may have any format if the conversion rule information includes minimum information which can convert a common API call into a device-dependent API call. In the present embodiment, as illustrated in FIG. 5, the conversion rule information has a conversion table of arguments for request and a format conversion table of response code/message for response.

Although the information accumulated by the device information storage 305 is as shown in FIG. 5 in the present embodiment, the information is not limited to the data structure shown in FIG. 5. The information may include other information. For example, it is assumed to manage information necessary to use a resource depending on a protocol supported by a device or manage version information assuming a revision of API. The information may be managed by a separate table as a database. For example, the information may have a hierarchical structure as a table configuration, such as, associating class (object) information that bundles functions with Service information of DLNA.

The conversion unit 306 converts the resource usage request inputted from the program execution unit 302 by using the device information accumulated in the device information storage 305. In other words, the conversion unit 306 converts a resource usage request having the first format into the second format. The resource providing apparatus 103 transmits the resource usage request which is generated by the conversion to the resource providing apparatus 103. When the resource providing apparatus 103 receives a processing result (for example, a notification indicating that the resource providing apparatus makes a recording reservation) via the first communication unit, the resource providing apparatus 103 converts the processing result according to an output format of JavaScript API and outputs the converted processing result to the program execution unit 302 if necessary.

Figure 13:
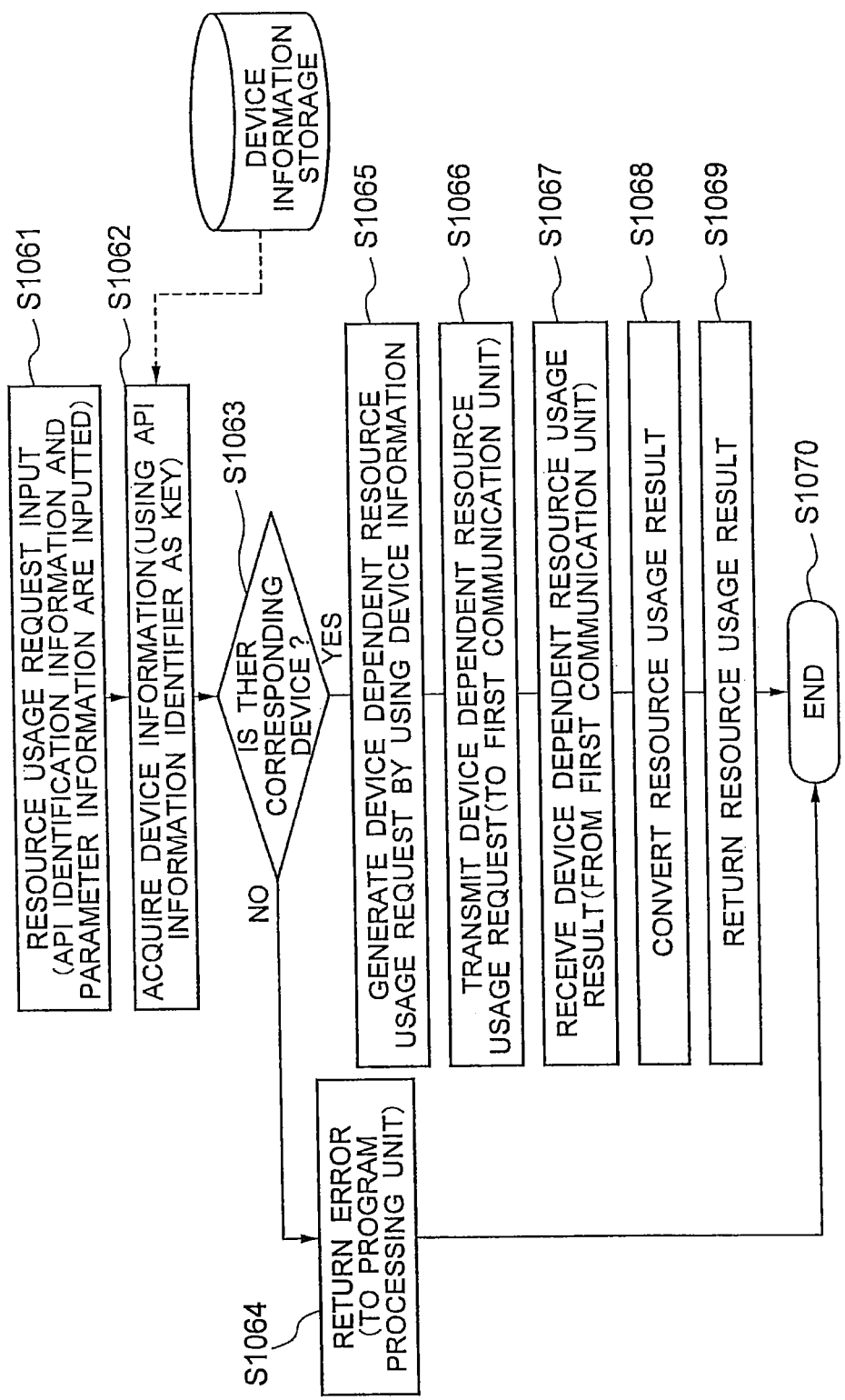
FIG. 13 is a flowchart of a conversion unit according to the first embodiment.
Figure 16:
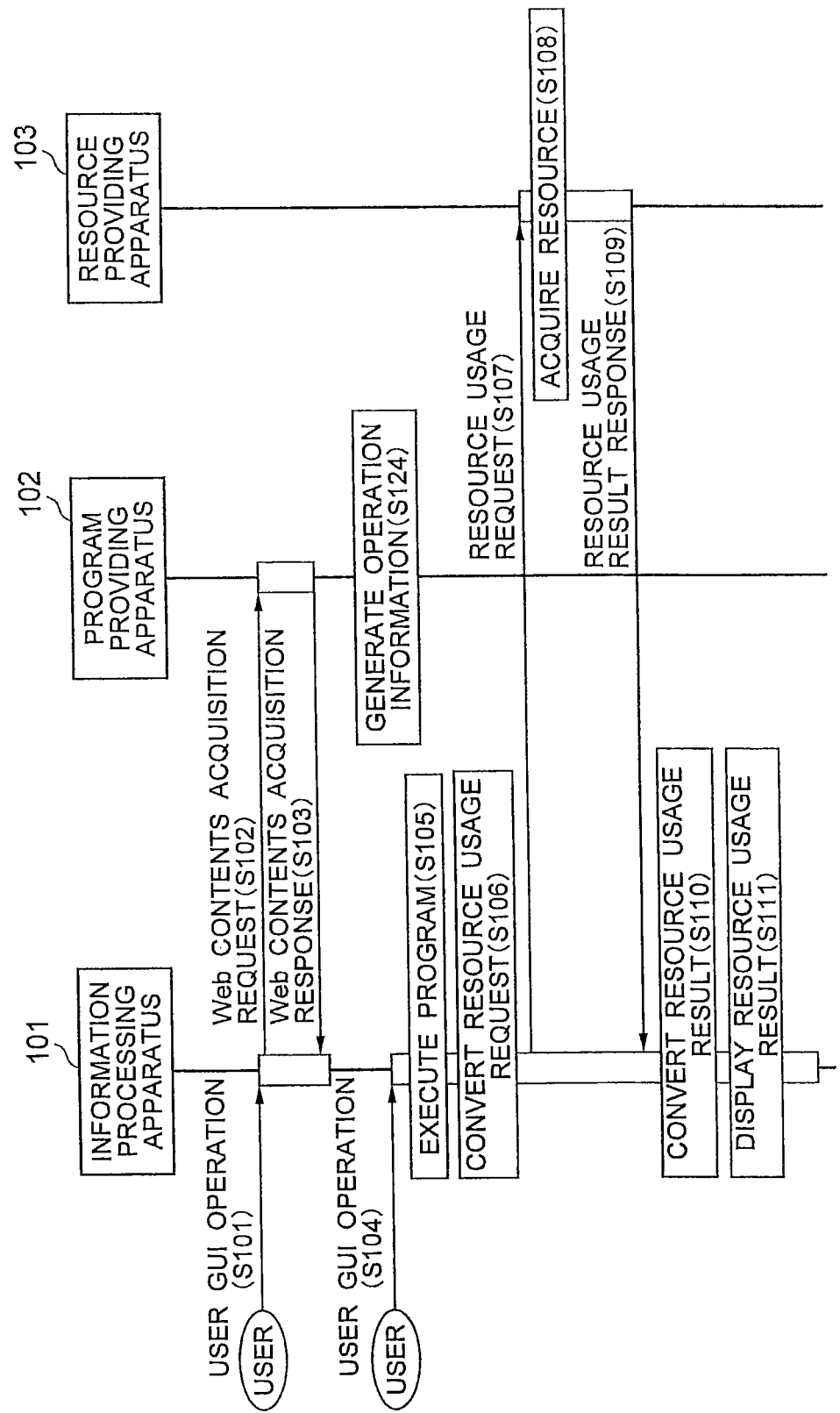
FIG. 16 is a sequence diagram between system components according to the first embodiment.

Next, an operation of the information processing apparatus 101 according to the present embodiment will be described with reference to FIGS. 1, 5, 13, and 16. FIG. 16 shows a basic sequence between system components including the information processing apparatus according to the present embodiment. FIG. 13 is a flowchart of a process of the conversion unit according to the present embodiment.

Hereinafter, a procedure will be described on the basis of the sequence diagram of FIG. 16.

It is assumed that a user uses a browser on the information processing apparatus 101. The user joins an NPVR service that realizes a recording reservation of a TV program on a cloud service and the device information of the resource providing apparatus is registered in the device information storage 305 in the information processing apparatus 101.

First, the user accesses the electronic program guide service developed on the program providing apparatus 102 via the browser (step S101). The browser transmits an HTTP GET request to the program providing apparatus 102 (step S102) and the program providing apparatus 102 returns Web contents of the electronic program guide service (step S103). As described above, a TV program table is displayed in the Web contents and a "recording reservation" button is arranged in each program field.

Here, when the user presses a recording reservation button in a program field of a TV program of which the user wants to make a recording reservation (step S104), the program execution unit 302 executes a JavaScript code including a resource usage request embedded in the Web contents (step S105). Here, the JavaScript API (PVRDevice.reserve) described above is called and inputted into the conversion unit 306 along with parameter information. In the conversion unit 306, the JavaScript API call on the Web contents is converted into an actual resource usage request (recording reservation request) depending on device/service (step S106).

Here, an internal process of the conversion unit 306 will be described on the basis of FIG. 13. First, the program execution unit 302 notifies the conversion unit 306 that a resource usage request occurs (the program execution unit 302 inputs API identification information and parameter information into the conversion unit 306) (step S1061). The conversion unit 306 inquires of the device information storage 305 about a device including an API identifier (here, API name: pvrDevice.reserve) by using the API identifier as a key (step S1062). If there is no corresponding device/service (NO in step S1063), the conversion unit 306 returns an error indicating that there is no corresponding device (step S1064). Here, there is the NPVR service on the Internet (YES in step S1063), so that the device information of the NPVR service is acquired. The conversion unit 306 is included in the device information.

The conversion unit 306 generates a recording reservation request (a device-dependent resource usage request) to the NPVR service described below by using location information of the API and parameter conversion information (step S1065).

http://npvr.service.com/webapi/reserve?network=1&service=2&transport=3&event=456

Subsequently, the conversion unit 306 transmits the generated resource usage request to the first communication unit 301 (step S1066), receives a processing result (step S1067), converts the processing result into a response message of JavaScript API (step S1068), returns the response message of JavaScript API (step S1069), and completes the process. The conversion to the response message is performed by, for example, storing a conversion table of response data and error code in the device information storage 305 in the same manner as in the case of request and using the conversion table. For example, if the response of the NPVR is XML format and the response of the JavaScript API is JSON format, the format conversion is performed in step S1068 described above.

Here, let us return to the entire sequence of FIG. 16. The sequence after the resource usage request conversion will be described.

When the conversion unit 306 transmits the generated resource usage request to the first communication unit 301 in step S1066 in FIG. 13, the first communication unit 301 transmits the resource usage request to the resource providing apparatus 103 as an HTTP(S) GET request (step S107). The resource providing apparatus 103 makes a recording reservation of the program based on the received request (step S108) and returns a result (step S109). The first communication unit 301 inputs a received response message into the conversion unit 306. The conversion unit 306 converts the inputted response message into a response message of JavaScript API and outputs the converted response message to the program execution unit 302. On the other hand, the program execution unit 302 returns the response message to the Web contents (program) (step S110).

For example, if the response message is a successful response of the recording reservation, the program displays a message, such as for example, "the recording reservation of the program is successfully made", on a screen (step S111).

As described above, according to the information processing apparatus of the present embodiment, the recording reservation can be made without disclosing to the electronic program guide service (the program providing apparatus) that the user joins in the NPVR service (the resource providing apparatus). In other words, it is possible to carry out a service for mashing up (associating) a Web service of a service provider and a resource of a device to be accessed without disclosing information of the device to be accessed to the service provider.

Second Embodiment

Next, a second embodiment of the information processing apparatus will be described. The same components as those of the first embodiment will be described by giving the same reference numerals or the descriptions thereof will be omitted.

An assumed specific use case will be described as an outline of the present embodiment.

First, a user browses a Web page of a service (the electronic program guide service described above) on the Internet and presses a "record button" of a program field of which the user wants to make a recording reservation. When the button is pressed, JavaScript code embedded in the Web page being browsed is executed and "recording reservation function at PC peripheral AV device" is called as an internal function of a PC. When the internal function is performed, a specified program is recorded in a home digital TV in which a recording reservation function is implemented. The difference from the first embodiment is that a recording reservation is made on a digital TV on a home network instead of the NPVR service on the Internet.

In the above use case, the digital TV is the resource providing apparatus and the home network is a second network. Hereinafter, the details of the present embodiment will be described.

Figure 2:
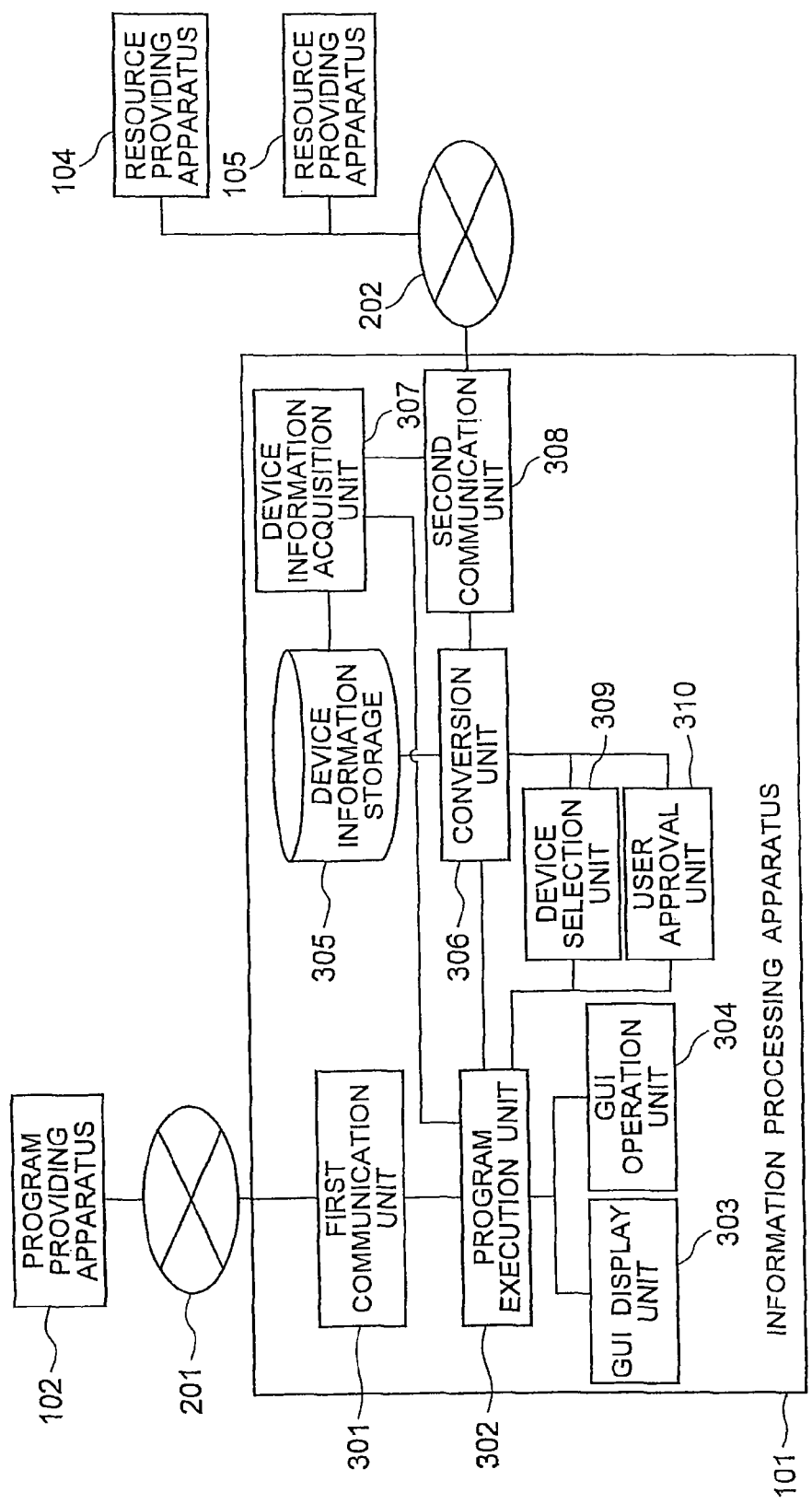
FIG. 2 is a block diagram showing a configuration of a system according to a second embodiment.

FIG. 2 is a system configuration diagram including functional blocks of the information processing apparatus according to the second embodiment. The program providing apparatus 102 in FIG. 2 is the same as that in the first embodiment. The difference in the system configuration from that in the first embodiment is that a network 202 is added and resource providing apparatuses 104 and 105 are disposed on the network 202.

The network 202 is a wireless or wired IP network, a peripheral device connection network such as USB, HDMI, and IEEE1394, a near field wireless network or a close proximity wireless network such as Transfer Jet and an infrared network, or various networks and interfaces that can transmit and receive information to and from an information processing apparatus, such as an SD card, a storage such as an external HDD, and a disk medium such as CD and DVD. In the present embodiment, the network 202 is assumed to be a LAN (Local Area Network) forming a home network.

The resource providing apparatuses 104 and 105 have the same hardware configuration as that of the resource providing apparatus 103 of the first embodiment. In the present embodiment, the resource providing apparatuses 104 and 105 are digital home appliances. Specifically, the resource providing apparatus 104 is a digital TV and the resource providing apparatus 105 is a hard disk recorder (the resource providing apparatus 103 of the first embodiment is assumed to be a server apparatus on the Internet). The digital TV has a recording function of DLNA (SRS: Scheduled Recording Service).

Next, the information processing apparatus 101 has a hardware configuration similar to that of the first embodiment. However, as new functional blocks, a device information acquisition unit 307, a second communication unit 308, a device selection unit 309, and a user approval unit 310 are added. These units are generated on the main storage such as a RAM when the CPU executes a program. Following the addition of the functional blocks, the data configuration of the device information stored in the device information storage 305 and the process flow of the conversion unit 306 are extended.

Hereinafter, each of the additional units will be described.

The device information acquisition unit 307 detects a resource providing apparatus on the network 202 and acquires the device information of the resource providing apparatus. The device information acquisition unit 307 performs functions of a Discovery step and a Description step in the DLNA. The device information acquisition unit 307 may be configured to periodically transmit a search message to the network 202 via the second communication unit 308, may be configured to monitor the network 202 at all times and catch an announcement message (DLNA Advertise message) flowing on the network 202, or may be configured to transmit a search message according to a request from the conversion unit 306 when a resource usage request is inputted into the conversion unit 306. In the present embodiment, the device information acquisition unit 307 periodically collects device information independently from the process of the conversion unit 306.

The second communication unit 308 communicates with the resource providing apparatuses 104 and 105 on the network 202. The second communication unit 308 performs communication for detecting (or discovering) a resource providing apparatus on the network 202 by the device information acquisition unit 307 described later and communication for using a resource by a program via the conversion unit 306. In the present embodiment, the second communication unit 308 is a communication unit of an HTTP client and a DLNA client (control point).

When a plurality of devices to which a resource usage request is transmitted are detected, the device selection unit 309 displays a user interface for selecting a device on the GUI display unit 303 via the program execution unit 302, acquires a selection result of the user from the program execution unit 302, and inputs the result into the conversion unit 306.

When user's approval is required to use a resource including resources (peripheral device information) on the information processing apparatus 101, the user approval unit 310 displays a user interface for approving the use on the GUI display unit 303 via the program execution unit 302, acquires an approval result of the user from the program execution unit 302, and inputs the result into the conversion unit 306. Further, the user approval unit 310 can be configured to store the approval result of the user and use the approval result for a certain period or for good.

Next, modifications of the data structure in the device information storage 305 will be described. FIG. 6 shows an example of the data structure according to the present embodiment. The difference from the first embodiment (FIG. 5) is that device name, necessity or not of user approval, date and time of user approval, result of user approval, and validity period of user approval are added. The additional items will be described in turn.

The "device name" information is display character string information that represents device names listed on a user selection interface generated by the device selection unit 309.

The "necessity or not of user approval" information is a Boolean value indicating whether or not an approval of the user who operates the information processing apparatus 101 is required to use a resource of the resource providing apparatus.

The "date and time of user approval" information indicates date and time when the user approval is obtained to use the resource of the resource providing apparatus.

The result of user approval is result information of the user approval and is a Boolean value indicating approval or denial.

The "validity period of user approval" information is information indicating a period in which the result of user approval is applied. In the example of FIG. 6, the "validity period of user approval" information is specified in seconds. The "validity period" information can indicate an indefinite period. For example, when a negative value or 0 is specified, the "validity period" is set to an indefinite period.

Figure 14:
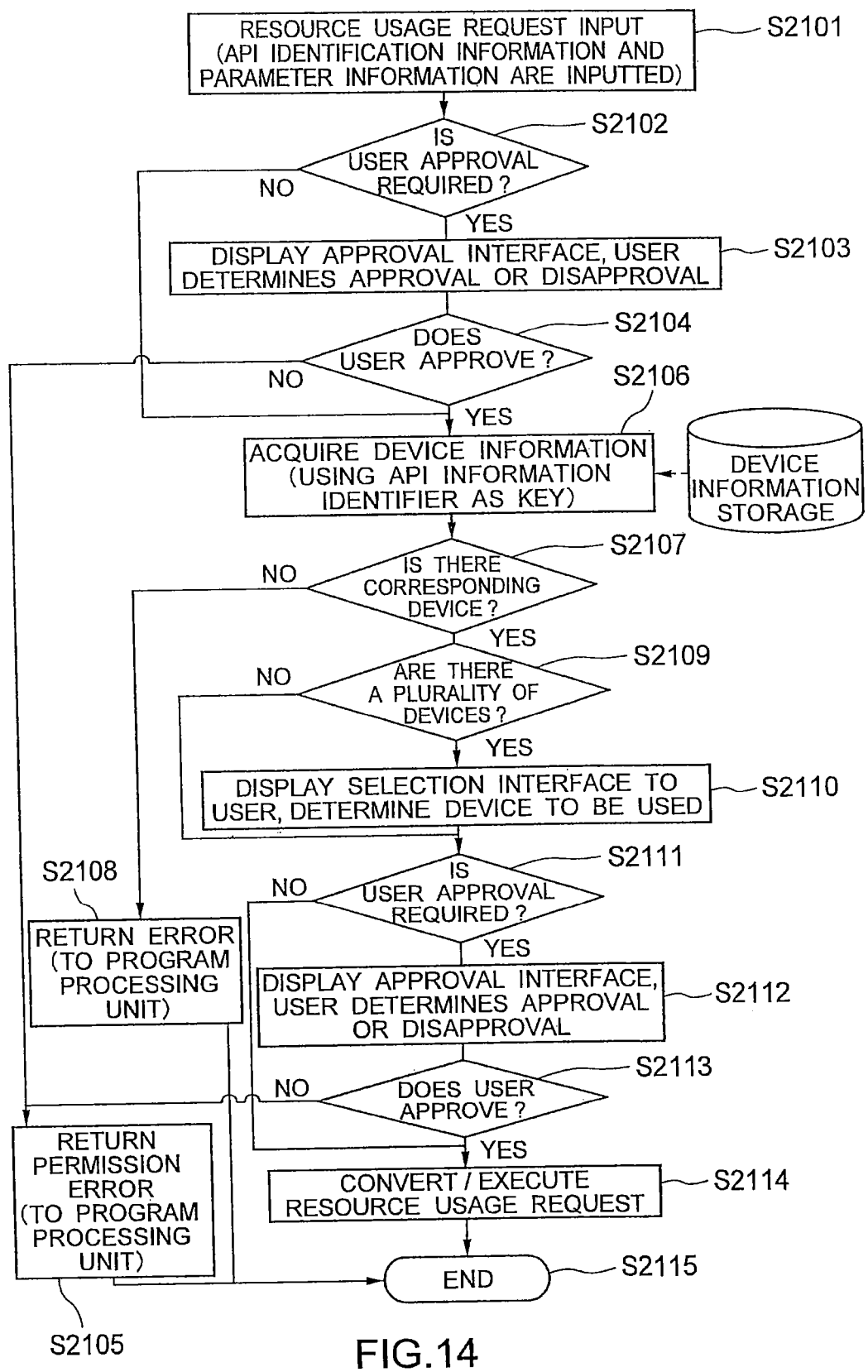
FIG. 14 is a flowchart of a conversion unit according to the second embodiment.
Figure 17:
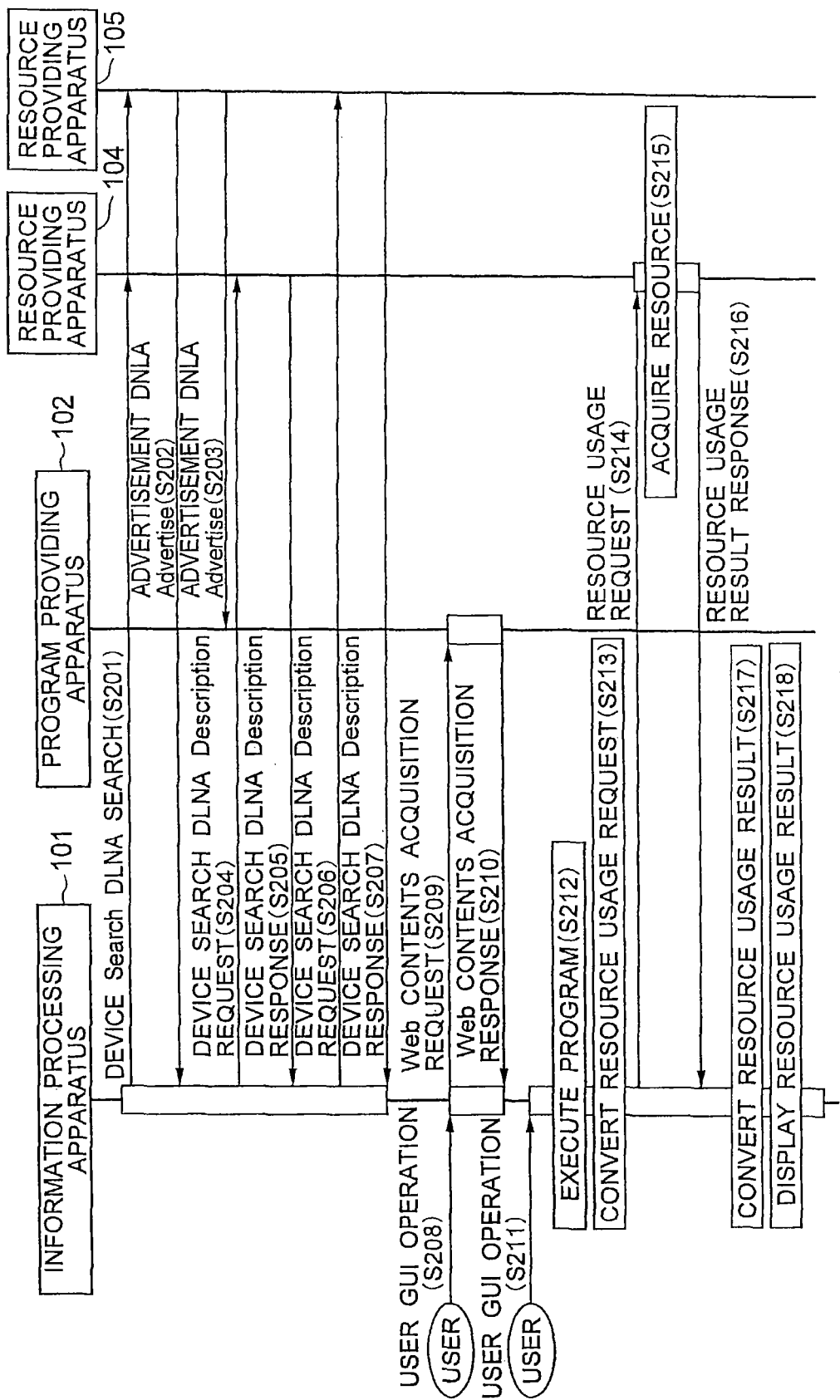
FIG. 17 is a sequence diagram between system components according to the second embodiment.

Next, an operation of the information processing apparatus 101 according to the present embodiment will be described with reference to FIGS. 2, 6, 14, and 17. FIG. 14 is a flowchart showing a process flow of the conversion unit 306 according to the present embodiment. FIG. 17 shows a basic sequence between system components including the information processing apparatus according to the present embodiment. Hereinafter, a procedure will be described on the basis of the sequence diagram of FIG. 17.

First, before the user accesses the electronic program guide service developed on the program providing apparatus 102 via the browser, the device information acquisition unit 307 periodically obtains information of the resource providing apparatuses on the network 202. Specifically, the device information acquisition unit 307 transmits a Search message of DLNA via the second communication unit 308 (step S201). The resource providing apparatuses 104 and 105 on the network 202 receive the Search message and transmit an Advertise message (steps S202 and S203). When receiving the Advertise message, the device information acquisition unit 307 recognizes the presence of the resource providing apparatuses 104 and 105 and transmits an acquisition request message of detailed device information to each of the resource providing apparatuses 104 and 105 (steps S204 and S206). Each of the resource providing apparatuses 104 and 105 returns the device information (steps S205 and S207). When the resource providing apparatuses provides a plurality of services, the device information acquisition sequence (steps S204-S205, S206-S207) may occur a plurality of times.

Here, in the same manner as in the first embodiment, the user accesses the program providing apparatus 102 (the electronic program guide service) and presses a recording reservation button of a program of which the user wants to make a recording reservation, so that a program embedded in the Web contents is executed (steps S208 to S212). This is the same as steps S101 to S105 in the first embodiment, so that the description thereof will be omitted.

Here, an internal process of the conversion unit 306 will be described on the basis of FIG. 14. First, the program execution unit 302 notifies the conversion unit 306 that a resource usage request occurs (the program execution unit 302 inputs API identification information and parameter information into the conversion unit 306) (step S2101). When receiving the resource usage request, the conversion unit 306 determines whether or not to obtain an approval to access the peripheral device information on the network 202 (home network) from the user (step S2102). The conversion unit 306 may be configured to obtain the approval every time as described above, may be configured to set a validity period and obtain the approval again when the validity period expires, or may be configured not to obtain the approval, which is obtained once, unless it is initialized (the validity period is managed by the user approval unit 310). If it is determined that the approval is required, the conversion unit 306 causes the user approval unit 310 to display a user approval interface. The user approval unit 310 displays an interface (pop-up screen or the like) to obtain the approval from the user on the GUI display unit 303 via the program execution unit 302. For example, words such as "Web page requests to use peripheral device information. May the Web page use the information? [OK] [NG]" are displayed and the user is prompted to select one of the options. The user approval unit 310 obtains the selection result of the user via the program execution unit 302 and outputs the selection result to the conversion unit 306. If the user denies the access (step S2104), the conversion unit 306 determines that a permission error occurs, returns an error to the program execution unit 302, and completes the process (step S2105). On the other hand, if the user approves the access, the conversion unit 306 obtains the device information of the resource providing apparatus having a resource corresponding to the API from the device information acquisition unit 307 (step S2106). Here, the resource providing apparatuses 104 and 105 are a digital TV and a hard disk recorder respectively. If both apparatuses have a recording function, there are a plurality of corresponding devices (step. S2109), so that the conversion unit 306 requests the device selection unit 309 to display a device selection interface. The device selection unit 309 displays the device selection interface via the program execution unit 302 to cause the user to select a device (step S2110). Here, if the user selects the digital TV, the conversion unit 306 determines whether or not the approval to access the device needs to be obtained (step S2111) in the same manner as in step S2102. In this determination, the information of "whether the approval is required or not", the information of the validity period, and the like, which are included in corresponding API information of the corresponding device in the device information storage 305, may be used. If it is determined that the approval needs to be obtained, the user approval unit 310 displays an approval interface on the screen and returns an input result of the user to the conversion unit 306 (step S2112). If the user denies the access, the conversion unit 306 returns a permission error to the API call and completes the process (step S2105). On the other hand, if the user approves the access, the conversion unit 306 converts the JavaScript API call into an Action command (SOAP message)

of DNLA in the present embodiment, performs the process of steps S1065 to S1069 in FIG. 13 of the first embodiment, and returns the result to the program execution unit 302 (step S2114).

As described above, according to the present embodiment, the recording reservation can be made without disclosing the information including the presence of the digital home appliances (the resource providing apparatuses) arranged on the home network to the electronic program guide service (the program providing apparatus). In other words, co-operation between a Web service and home appliances, that is, the mash-up service, can be realized without disclosing information related to privacy, such as what devices the user has, to the Web service while preventing unauthorized access from an external Web service to the home appliances. Also, according to the present embodiment, resource related to the co-operation function can be used on the basis of the user's approval.

Third Embodiment

Next, a third embodiment of the information processing apparatus will be described. The same components as those of the first and the second embodiments will be described by giving the same reference numerals or the descriptions thereof will be omitted.

The present embodiment is almost the same as the second embodiment except that the resource providing apparatus (digital TV) requires a user's authentication/permission. Specifically, a resource use target device is determined on the information processing apparatus (PC), and then the digital TV requires user authentication and an access permission of the user. Regarding the permission process, it can be considered that an access permission apparatus (for example, a user support service site operated by a manufacturer of the digital TV) on the network 201 (the Internet) performs by proxy the user authentication and the access permission of the user. However, in the present embodiment, as an example, a case in which the digital TV itself performs basic authentication will be described. The information processing apparatus (PC) presents information (hereinafter referred to as a ticket) which verifies that authentication/permission issued by the digital TV is obtained, to the digital TV. The digital TV confirms the validity of the presented ticket and returns a resource only to the information processing apparatus in which the user authentication is successfully performed and the access permission of the user is obtained.

Figure 3:
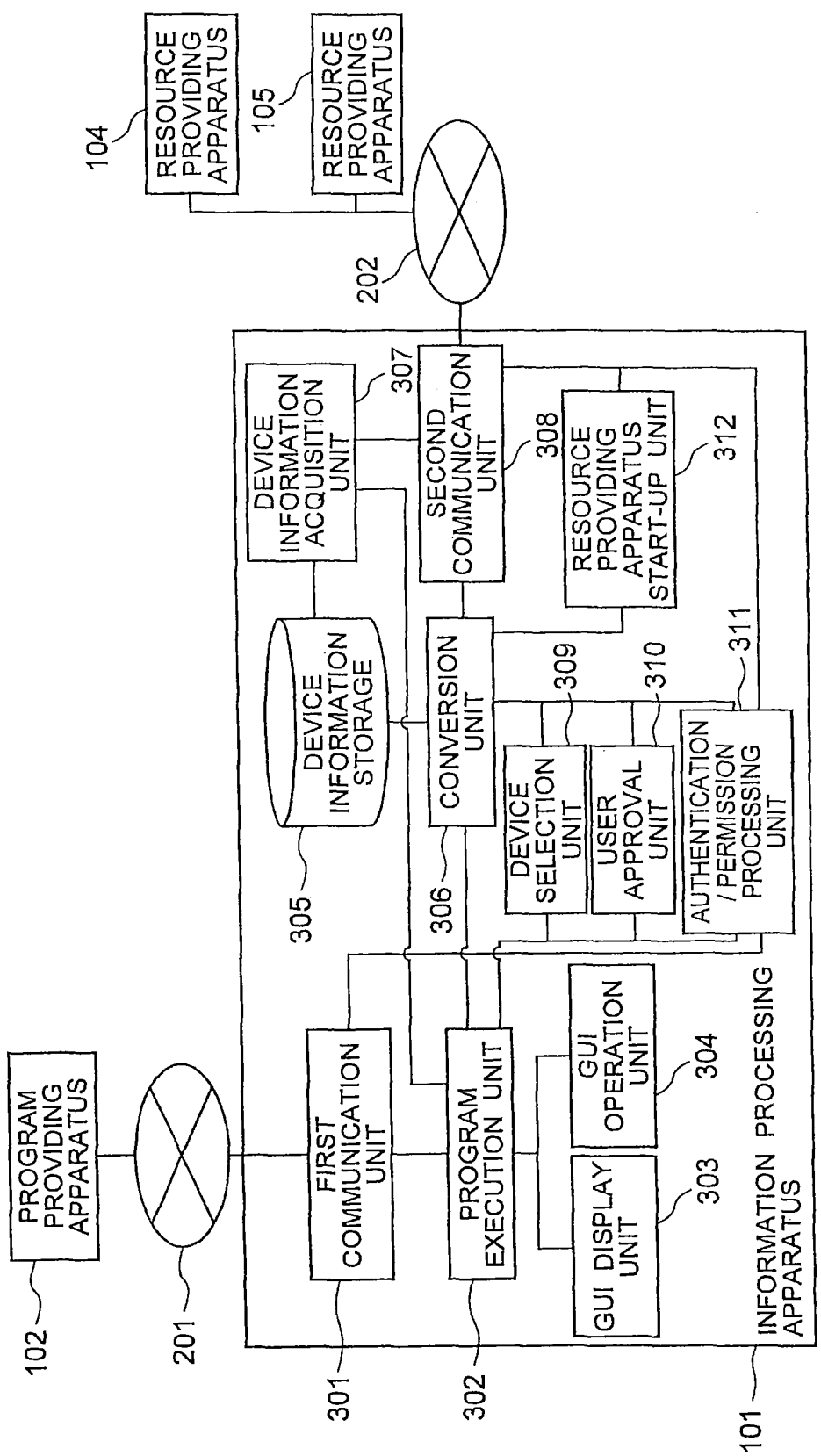
FIG. 3 is a block diagram showing a configuration of a system according to a third embodiment.

FIG. 3 is a system configuration diagram including functional blocks of the information processing apparatus according to the third embodiment. The entire configuration of the system is the same as that of the second embodiment.

Next, the information processing apparatus 101 has a hardware configuration similar to that of the first and the second embodiments. However, as new functional blocks, an authentication/permission processing unit 311 and a resource providing apparatus start-up unit 312 are added.

These units are generated on the main storage such as a RAM when the CPU executes a program. Following the addition of the functional blocks, the data configuration of the device information stored in the device information storage 305 and the process flow of the conversion unit 306 are extended.

Hereinafter, each of the additional units will be described.

The authentication/permission processing unit 311 receives an authentication/permission processing request and performs authentication/permission processing to use a resource by using the first communication unit 301, the second communication unit 308, and the user approval unit 310 on the basis of an access authentication/permission method information of the corresponding resource providing apparatuses (104 and 105) stored in the device information storage 305. It is assumed that the authentication/permission processing is basic authentication or digest authentication performed on the resource providing apparatus, OAuth authentication that realizes an access permission by proxy on an external device (an access permission apparatus) different from the resource providing apparatus, or the like. The authentication/permission processing unit 311 behaves as an authentication client thereof.

The resource providing apparatus start-up unit 312 starts up a resource providing apparatus that is in a sleep state on the network 202 by using Wake On LAN or the like and changes the state of the resource providing apparatus to be able to perform communication. The resource providing apparatus start-up unit 312 is called by the conversion unit 306 when an apparatus to which a resource usage request should be transmitted is not detected.

Next, modifications of the data structure in the device information storage 305 will be described. FIGS. 7A and 7B show an example of the data structure according to the present embodiment. The difference from the second embodiment (FIG. 6) is that protocol type, access authentication/permission method information, ticket information, ticket validity period, and MAC address are added. The additional items will be described in turn.

The protocol type information is information of communication protocols supported by the resource providing apparatus, such as DLNA, IEEE1394, and ECHONET that is a protocol for large household electrical appliances on the network 202. Although, in the present embodiment, the protocol type is limited to the DLNA, it is assumed that various protocols other than those described above are used. The device information acquisition unit 305 collects device information in accordance with each protocol.

The access authentication/permission method information is information indicating an authentication method required by the resource providing apparatus, such as the basic authentication, the digest authentication, or the OAuth authentication. If the method has a plurality of versions, it can be considered that the version information is also stored.

The ticket information is information indicating that permission is obtained and is information to be presented to the resource providing apparatus. In the same manner as the license information, the ticket information has different information and format required for each piece of the access authentication/permission method information. In the present embodiment, the ticket information indicates that permission is given in accordance with the OAuth authentication.

The ticket validity period information is information indicating the validity period of the ticket.

Finally, the MAC address of a device is used to start up a device that is in a sleep state. The MAC address is not necessary when the device identifier information can be used instead of the MAC address.

Although only four items are added to the device information of the present embodiment, further information may be required according to the authentication/permission method, so that it is assumed that various information can be held, which is required for an access authentication/permission procedure necessary for the information processing apparatus to access the resource providing apparatus.

Figure 15:
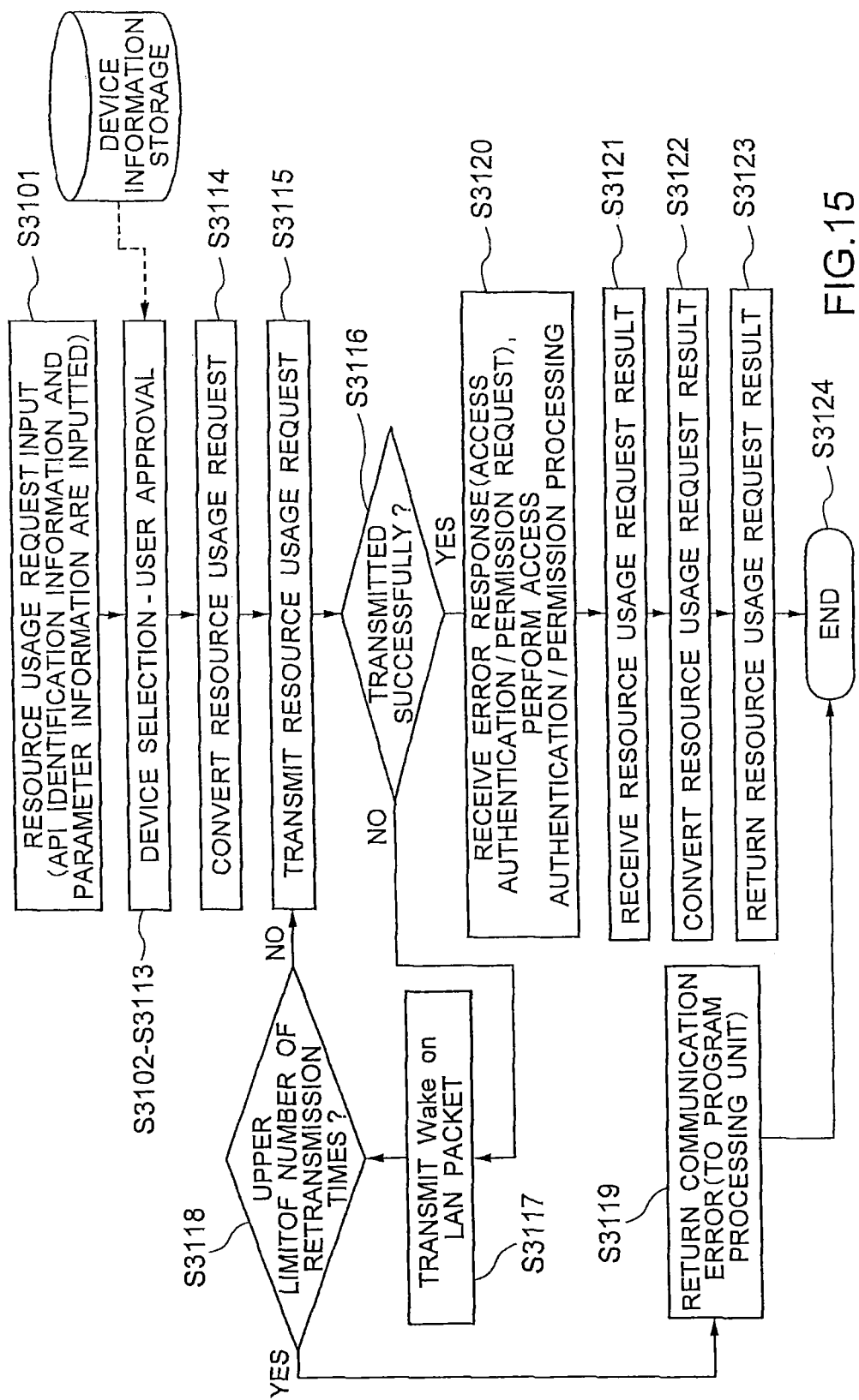
FIG. 15 is a flowchart of a conversion unit according to the third and the fourth embodiments.
Figure 18:
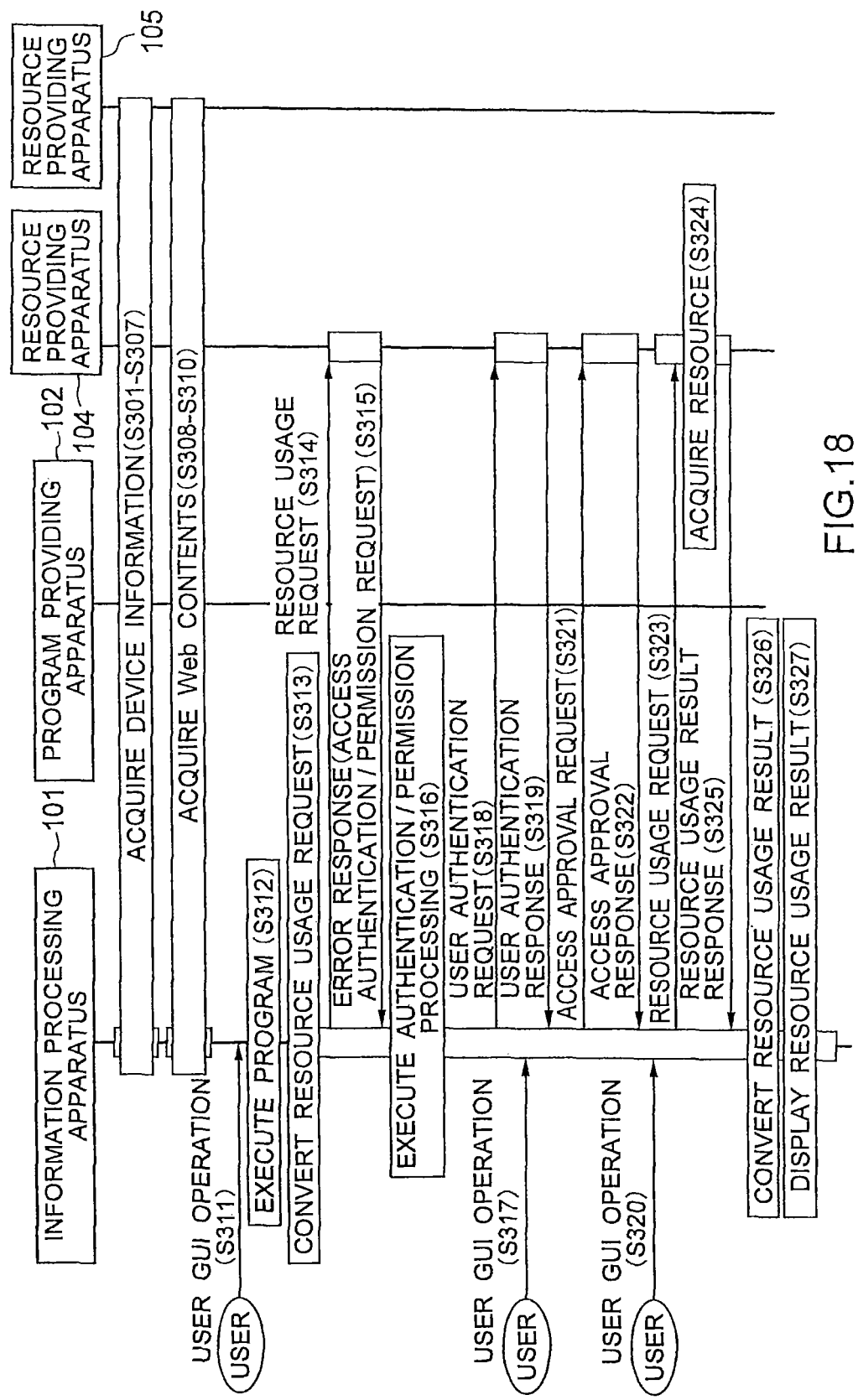
FIG. 18 is a sequence diagram between system components according to the third embodiment.

Next, an operation of the information processing apparatus 101 according to the present embodiment will be described with reference to FIGS. 3, 7, 15, and 18. FIG. 15 is a flowchart showing a process flow of the conversion unit 306 according to the present embodiment. FIG. 18 shows a basic sequence between system components including the information processing apparatus according to the present embodiment.

Hereinafter, a procedure will be described on the basis of the sequence diagram of FIG. 18.

First, the procedure (S301 to S307) for the device information acquisition unit 307 to collect the device information is the same as steps S201 to S207 in the second embodiment, so that the description thereof is omitted here. The device information acquisition unit 307 obtains the device information of the resource providing apparatuses 104 and 105 on the basis of, for example, a procedure of Discovery and Description steps of the DLNA, and stores the device information in the device information storage 305. When the procedure to collect the device information follows other protocols such as ECHONET used for large household electrical appliances and IEEE1394, a mechanism for detecting a device in each protocol may be used.

The processes from the subsequent Web contents acquisition process including acquisition of a resource usage program from the program providing apparatus 102 to the start of execution of the resource usage program which is started when a user presses the "recording reservation" button in the Web contents are the same as those in the second embodiment (S308 to S312). The processes described above including the device information acquisition process are the same as those of steps S201 to S212 in the second embodiment.

Here, a resource usage request conversion process (step S313) performed by the conversion unit 306 will be described with reference to FIG. 15. In the same manner as in the second embodiment, the conversion unit 306 performs device selection and approval of use of resource of the device selected by the user on the basis of the information in the device information storage 305 (steps S3102 to S3113). These processes are also the same as those of steps S2102 to S2113 of the second embodiment shown in FIG. 14. In the present embodiment, the conversion unit 306 converts the resource usage request into a device-dependent request message (step S3114) and transmits the request message to the device (step S3115). Thereafter, if the address of the transmission destination cannot be solved and the transmission fails (step S3116), the conversion unit 306 requests the resource providing apparatus start-up unit 312 to remote start the corresponding resource providing apparatus. The resource providing apparatus start-up unit 312 receives the request from the conversion unit 306, transmits a Wake On LAN packet to the corresponding device, and starts up the corresponding resource providing apparatus 104 over the Ethernet (step S3117). The resource providing apparatus start-up unit 312 repeats the transmission until the resource usage request transmission is successfully performed and the apparatus starts or the number of retransmission times reaches an upper limit. If the number of retransmission times reaches the upper limit (YES in step S3118), the conversion unit 306 returns a communication error to the program execution unit 302 (step S3119) and completes the process (step S3124). If the transmission of the resource usage request to the resource providing apparatus 104 is successfully performed, in the present embodiment, the conversion unit 306 receives information indicating that access authentication (basic authentication) is required from the resource providing apparatus as an error response. This is realized by, for example, an HTTP/1.1 401 Authorization Required response. However, this is not limited to this response when the access authentication is not the basic authentication or the digest authentication, and this may be realized by an individual method. Further, it is possible to store information indicating whether or not the access authentication/permission is required on the device in the device information storage 305 and employ a method for directly performing the authentication/permission without receiving the 401 response on the basis of the stored information. When receiving an access authentication request, the conversion unit 306 requests the authentication/permission processing unit 311 to perform the authentication/permission processing, and the authentication/permission processing unit 311 performs the authentication/permission processing (step S3120). When the authentication/permission processing is successfully performed, the resource is actually used, and the conversion unit 306 converts a received processing result and returns a response to the program execution unit 302, so that a series of processes are completed (steps S3121 to S3124).

Here, the authentication/permission processing in step S3120 in the flowchart of FIG. 15 will be described with reference to the sequence diagram of FIG. 18. First, the authentication/permission processing unit 311 receives a 401 response of HTTP (steps S315 and S316) and displays a pop-up screen requesting input of a user account and a password set on the resource providing apparatus 104 (digital TV) via the program execution unit 302. When the user inputs a user account and a password onto the pop-up screen (step S317), the two inputted values are connected by ":", the connected values are encoded into data using Base64, and the data is specified as an authentication header and transmitted (step S318). When the specified user account and password are correct, the resource providing apparatus 104 transmits a response message requesting the user to approve the resource usage request from the information processing apparatus 101 along with a response indicating that the authentication is successfully performed (step S319). The authentication/permission processing unit 311 displays a pop-up screen requesting the user to permit the request via the program execution unit 302 in the same manner as in the authentication. For example, the authentication/permission processing unit 311 displays a message confirmation screen such as "Recording reservation message from PC to digital TV is received. Do you approve the recording reservation? [OK] [NG]." When the user clicks "OK" to approve the access (that is, use of the resource) (step S320), the approval of the user is transmitted to the resource providing apparatus 104 (step S321). When receiving the approval of the user, the resource providing apparatus 104 returns a confirmation response (step S322). The confirmation response may include temporary permission being information (ticket information) indicating approval of access, and the validity period of the approval. In the present embodiment, the ticket information is assumed to be character string information as illustrated in FIGS. 7A and 7B. However, the format of the ticket information is not limited. When the resource providing apparatus 104 returns a response such as the ticket information, the response format may be stored in a header (Authorization header) of authentication/permission of HTTP response or an individual extended header or may be stored in a response body in XML format or JSON format. When using an existing header, the same data as the data specified in the authentication/permission on the pop-up screen may be used as a ticket (when the authentication is the basic authentication, data obtained by encoding user ID and password using Base64 may be used as a ticket). The authentication/permission processing unit 311 returns the ticket information and the validity period information to the conversion unit 306. The conversion unit 306 includes the ticket information and the validity period information in a resource usage request massage and transmits the resource usage request massage (step S323). The resource providing apparatus 104 verifies the specified ticket information, executes the resource usage request (step S324), and returns a result (step S325). The subsequent processes are the same as those of steps from S3121 to S3124 in the flowchart of FIG. 15. Specifically, the conversion unit 306 converts the resource usage request processing result in accordance with a conversion rule stored in the device information storage 305 and returns the conversion result to a program executed on the program execution unit 302. Then, the program displays the result on a screen (step S326 and step S327).

As described above, according to the present embodiment, in addition to the effects described in the first and second embodiments, there is an effect that the program providing apparatus can use a resource not only when the user approval to the resource usage is required on the information processing apparatus 101, but also even when the resource providing apparatuses 104 and 105 request the user authentication and permission. The conversion unit 306 realizes access authentication and permission processing to resources of various device types, so that the program providing apparatus 102 need not handle each authentication/permission method. The series of authentication/permission processes are executed as internal processes of a call of a common API, so that the program providing apparatus 102 cannot know what authentication/permission processes are performed when using a resource. In other words, the program providing apparatus 102 cannot know the information of the user account and the password inputted by the user in the present embodiment. Therefore, even when an individual device requires user authentication and permission, it is possible to realize use of resource (mash-up service between Web contents and a home appliance resource) without disclosing user's confidential information related to these processes to the program.

Fourth Embodiment

Next, a fourth embodiment of the information processing apparatus will be described. The same components as those of the first, the second, and the third embodiments will be described by giving the same reference numerals or the descriptions thereof will be omitted.

The present embodiment is almost the same as the third embodiment except that the resource providing apparatus (digital TV) performs user authentication and access permission by using a service on the Internet and the user authentication/permission to the digital TV requires a permission to the program providing apparatus 102 instead of the information processing apparatus 101 (PC).

The former difference is that, in the present embodiment, an access permission apparatus (for example, a user support service site operated by a manufacturer of the digital TV) 107 on the network 201 (the Internet) performs by proxy the user authentication and the access permission of the user, whereas, in the third embodiment, when the digital TV requires the user authentication and the access permission of the user, the digital TV itself performs the basic authentication. At this time, the information processing apparatus (PC) presents information (hereinafter referred to as a token) which verifies that authentication/permission issued by the access permission apparatus is obtained, to the digital TV. When the digital TV confirms the validity of the presented token, the digital TV returns a resource only to the information processing apparatus in which the user authentication is successfully performed and the access permission of the user is obtained.

The latter difference is that the digital TV requires permission to "access from the electronic program guide service" in the present embodiment, whereas the digital TV requires approval to "access from PC" in the third embodiment.

Figure 4:
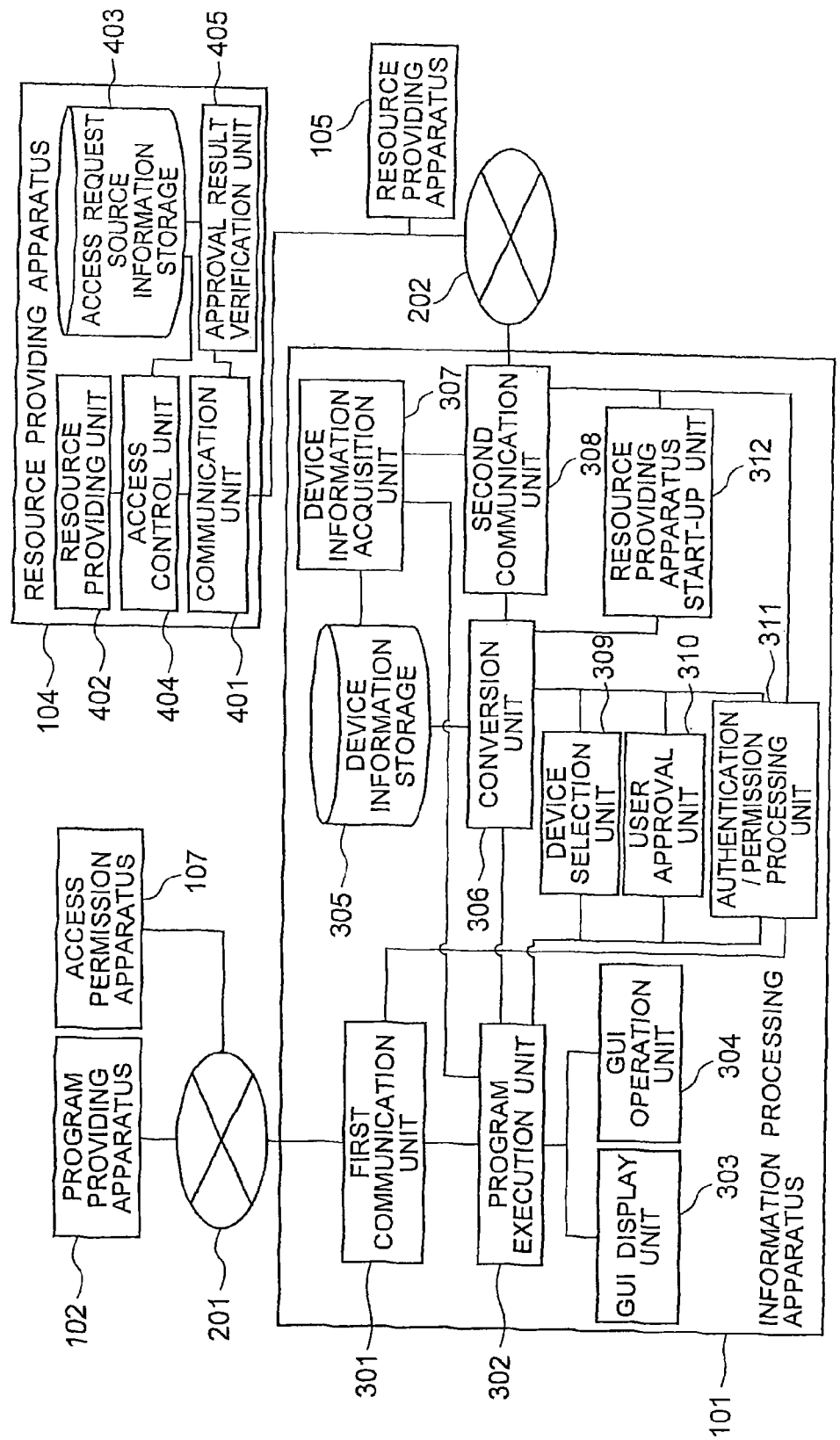
FIG. 4 is a block diagram showing a configuration of a system according to a fourth embodiment.

FIG. 4 is a system configuration diagram including functional blocks of the information processing apparatus according to the fourth embodiment. The difference in the system configuration from that in the second embodiment is that the access permission apparatus 107 is added on the network 201.

The access permission apparatus 107 also has a normal computer hardware configuration in the same manner as the program providing apparatus 102. Here, the access permission apparatus 107 is a server apparatus used in a data center or the like. As described above, the access permission apparatus 107 of the present embodiment is operated by a manufacturer that manufactures and sells the resource providing apparatus 104 (digital TV) and the access permission apparatus 107 provides a user support service. The service provides update information of a product and the like to a user who purchased the product and performed user registration using product information (type name, production number, and the like) of the purchased product and also provides an access authentication/permission service to usage of a resource in the product from a Web site on the Internet as realized in the present embodiment.

The hardware configuration and the functional blocks of the information processing apparatus 101 are substantially the same as those of the third embodiment.

On the other hand, although the resource providing apparatus 104 has the same hardware configuration as that of the second and the third embodiments, the resource providing apparatus 104 requires an access permission to the electronic program guide service (the program providing apparatus 102) instead of the PC (the information processing apparatus 101) as described above, so that the resource providing apparatus 104 includes a communication unit 401, a resource providing unit 402, an access request source information storage 403, an access control unit 404, and an approval result verification unit 405. These units are generated on the main storage such as a RAM when the CPU executes a program. Hereinafter, each unit will be described.

The communication unit 401 communicates with the information processing apparatus 101 on the network 202. The communication unit 401 receives a request for discovery of the resource providing apparatus on the network 202 by the device information acquisition unit 307 on the information processing apparatus 101, a request to use a resource by a program via the conversion unit 306, and an authentication/permission request associated with the use of the resource. In the present embodiment, the communication unit 401 is a communication unit of an HTTP server and a DLNA device.

The resource providing unit 402 provides a resource corresponding to a resource usage request received via the communication unit 401.

The access request source information storage 403 stores information of an access request source (or an access requestor), that is, information of the program providing apparatus 102 that provides Web contents in which a resource usage request program is embedded, instead of the information of the information processing apparatus 101. As illustrated in FIG. 9, the data structure of the information accumulated in the access request source information storage 403 of the present embodiment includes an access request source identifier, an access target resource identifier, a user identifier, access permission/refusal information, a user approval result, permission information, and a permission validity period.

The access request source identifier is identification information of the program providing apparatus 102. In the present embodiment, the access request source identifier is URL of the electronic program guide service.

The access target resource identifier is information for identifying the resource, the use of which is requested by the access request source. The access target resource identifier is information corresponding, to the device-dependent API location in the device information storage 305.

The user identifier is information for identifying the user on the resource providing apparatus 104. When there is no user account in the resource providing apparatus, this information need not be included.

The access permission/refusal information is information indicating whether the resource can be used by the access request source, which is determined by the user (the owner of the resource providing apparatus). The access permission/refusal information includes two values of permission and refusal or three values of permission, refusal, and not-yet-permitted. When an external access permission apparatus is used, the access permission/refusal information indicates permission or refusal of the access by the access permission apparatus, so that if an external access permission apparatus is not used, the access permission/refusal information is not required.

The user approval result is information indicating a determination result of permission or refusal of the access by the user (the owner of the resource providing apparatus). The user approval result includes two values of permission and refusal or three values of permission, refusal, and not-yet-permitted.

The permission information is ticket information indicating that an external access permission apparatus provides an approval when the external access permission apparatus is assumed to be used, in the same manner as the access permission/refusal information. The permission information is ticket information included in data on the device information storage 305 (see FIG. 8) on the information processing apparatus 101. The resource providing apparatus 104 determines permission or refusal of the access by comparing the permission information and the ticket information which the information processing apparatus 101 presents along with a resource usage request.

The permission validity period indicates the validity period of the permission information. The permission validity period is also used to determine permission or refusal of the access.

The access control unit 404 obtains access request source information included in the resource usage request. When the access control unit 404 receives an access request from an access request source for which the access permission/refusal information is not yet set, the access control unit 404 requests the information processing apparatus 101 to obtain access permission of the user. The access control unit 404 receives an approval result of the access permission/refusal of the user from the information processing apparatus via the communication unit 401, stores the result in the access request source information storage 403, and performs access control using the approval result.

When the resource providing apparatus 104 uses an external apparatus (access permission apparatus 107) for the access permission, the approval result verification unit 405 obtains permission information (ticket information) from the access permission apparatus 107 and verifies whether or not the approval is actually obtained by comparing the obtained permission information with the ticket information included in the resource usage request from the information processing apparatus 101.

Next, a difference between the information processing apparatuses 101 will be described. The internal processing of the conversion unit 306 and the data structure of the device information storage 305 in the present embodiment are different from those in the third embodiment.

Although, in the first to the third embodiments, the conversion unit 306 converts the resource usage request and the response in accordance with the conversion rule stored in the device information storage 305, in the present embodiment, the conversion unit 306 only loads a conversion program (conversion mechanism) provided by each resource providing apparatus.

Next, modifications of the data structure in the device information storage 305 will be described. FIG. 8 shows an example of the data structure according to the present embodiment. The difference from the third embodiment (FIGS. 7A and 7B) is that the protocol type and the conversion rule information are not included, a location of a conversion program is included instead of the conversion rule, and license information (license information secret key) is added. The additional items will be described in turn.

First, the location information of the conversion program is not the conversion rule described in the first to the third embodiments, but includes conversion codes themselves. Therefore, the conversion unit 306 need not perform a process to interpret a rule and perform conversion. By only executing the conversion program, a common API call is converted into an appropriate device-dependent resource usage request and also the obtained processing result can be converted.

The license information (license information secret key) is information indicating that the information processing apparatus 101 has a right to obtain access permission, which is necessary to obtain the access permission. Necessary license information and the format thereof are different for each access authentication/permission method information. For example, the license information may be an X509 client certificate or pair information of client identification information issued by the access permission apparatus 107 for each client and a secret key. The format is not limited. In the present embodiment, the license information is assumed to be a client credential (client identification information and secret key information) in accordance with the OAuth authentication.

The ticket information is information indicating that permission is obtained and is information to be presented to the resource providing apparatus. In the same manner as the license information, the ticket information has different information and format required for each piece of the access authentication/permission method information. In the present embodiment, the ticket information is assumed to be token information indicating that permission in accordance with the OAuth authentication is given.

The ticket validity period information (validity period of the access permission) is information indicating the validity period of the ticket. In the present embodiment, the ticket validity period information is validity period information of a token in accordance with the OAuth authentication.

Finally, the MAC address of a device is used to start up a device that is in a sleep state. The MAC address is not necessary when the device identifier information can be used instead of the MAC address.

Further information may be required according to the authentication/permission method. In this case, it is assumed that the device information can include various information, which is required for an access authentication/permission procedure necessary for the information processing apparatus to access the resource providing apparatus.

Figure 19:
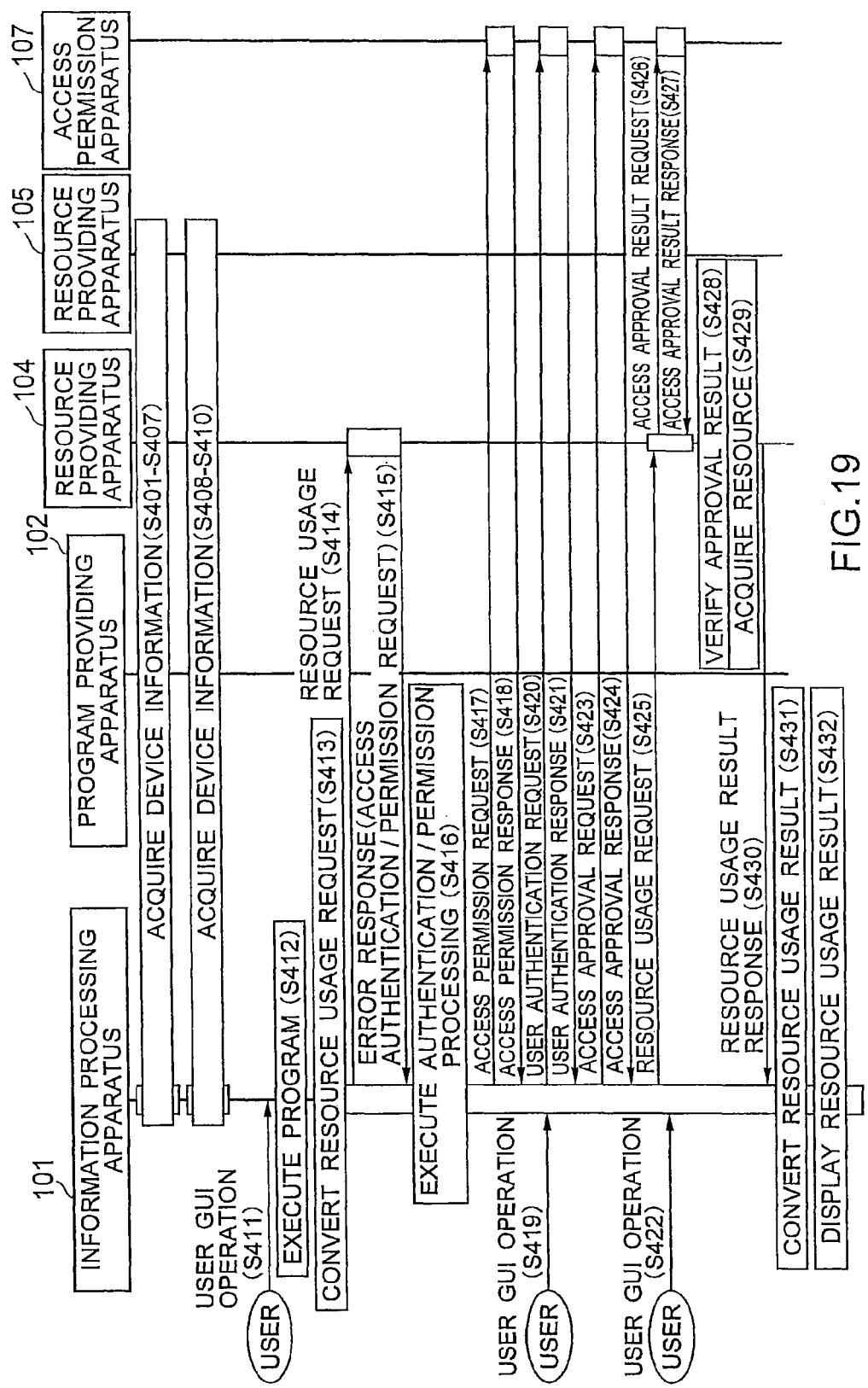
FIG. 19 is a sequence diagram between system components according to the fourth embodiment.

Next, an operation of the information processing apparatus 101 and the resource providing apparatus 104 according to the present embodiment will be described with reference to FIGS. 4, 8, 9, 10, 11, 12, and 19. FIG. 8 shows an example of the data configuration of the device information stored in the device information storage 305 according to the present embodiment. FIG. 10 shows an outline of the program (Web contents) provided by the program providing apparatus 102 according to the present embodiment. FIG. 11 shows an example of a library (pseudocode) that defines a resource usage API provided by the conversion unit 306. FIG. 12 shows an example of a conversion program (pseudocode) provided by the resource providing apparatus 104. FIG. 19 shows a basic sequence between system components including the information processing apparatus according to the present embodiment. The process of the conversion unit 306 is the same as that of the third embodiment and the process follows the flowchart shown in FIG. 15.

Hereinafter, a procedure will be described on the basis of the sequence diagram of FIG. 19. Only the differences from the third embodiment will be described.

First, the difference in device information acquisition steps (S401 to S410) is that, when the information processing apparatus 101 acquires information of the resource providing apparatuses 104 and 105, the conversion unit 306 adds a code to dynamically load each conversion program to a resource usage API definition library (FIG. 11) provided by the conversion unit 306 on the basis of the device identification information and the location information of the conversion program included in the device information. Specifically, the conversion unit 306 adds a code from the eighth line to the twelfth line in the case of the resource providing apparatus 104 and adds a code from the thirteenth line to the sixteenth line in the case of the resource providing apparatus 105. The conversion unit 306 only performs the above processes.

Subsequently, the user accesses the electronic program guide service provided by the program providing apparatus 102 and the user presses the recording reservation button of a specific program (step S411).

Here, an outline of the configuration of the Web contents of the electronic program guide service will be briefly described on the basis of FIG. 10. As shown in FIG. 10, the Web contents provided by the program providing apparatus 102 calls, in the Web contents, a program file useResource.js that uses a resource (here, a program file useResource.js that calls a reserve function that calls a recording reservation function of a home TV set) and a library file deviceAPI.js that defines the reserve function that is called by the useResource.js (in the seventh line and tenth line in FIG. 10, respectively). The former useResource.js is disposed on the program providing apparatus 102 and the latter deviceAPI.js disposed in the information processing apparatus 101 in the present embodiment. As described above, the latter file is dynamically rewritten by the conversion unit 306 when a device is detected or removed.

Next, the conversion processing of the conversion unit 306 in step S413 will be described. Although the process flow is similar to that of the third embodiment and follows FIG. 15, the conversion processing itself (steps S3121 to S3123 in FIG. 15) is mainly different from that of the third embodiment. This is because the conversion program provided by each resource providing apparatus performs the conversion processing in the present embodiment, whereas the conversion processing is performed by the conversion unit 306 in accordance with the conversion rule in the third embodiment.

The conversion processing will be described with reference to FIGS. 11, 12, and 15. The resource usage request input (S3101) corresponds to a call of the resource usage API (reserve function) provided by the information processing apparatus 101. The process of the subsequent steps S3102 to S3120 corresponds to an internal process of an internal pre- pare( ) function (the fourth line in FIG. 11). Here, identification of the device and the authentication/permission processing are completed and the identification information of the resource use target device is returned to the library (device-Api.js). Here, the resource of the resource providing apparatus 104 is used, so that a code from the eighth line to the twelfth line in FIG. 11 embedded by the conversion unit 306 is called and a conversion program (http://192.168.0.10:8888/upnp/control/pvr-srs-ctrl-js/transcode.js) on the resource providing apparatus is loaded and used. As shown in FIG. 12, all the processes from the conversion and transmission of the request to the reception and conversion of the response (steps S3121 to S3123 in FIG. 15) can be performed in the conversion program.

Subsequently, the conversion unit 306 on the information processing apparatus 101 transmits a resource usage request including the identification information (http://www.iepg.com from FIG. 9) of the electronic program guide service of the providing source of the resource usage request program to the resource providing apparatus 104 by a call of the conversion code (step S414). The communication unit 401 on the resource providing apparatus receives a resource usage request message and transfers the resource usage request message to the access control unit 404. The access control unit 404 refers to corresponding information in the access request source information storage 403 and detects that the access permission/refusal information is not yet set. The access control unit 404 determines that access permission is required on the access permission apparatus 107 and transmits information indicating that the access authentication (OAuth authentication) is required as an error response. Specifically, the access control unit 404 requests the conversion unit 306 to redirect to an access permission page on the access permission apparatus 107 on the network 201. This is realized by, for example, an HTTP/1.1 302 Found response (step S415). At this time, the access control unit 404 includes a callback URL to redirect again (redirect from the access permission apparatus 107 to the resource providing apparatus 104) and the identification information of the resource providing apparatus (UUID, MAC address, serial number+ model number, and the like) in the redirect destination URL.

When the conversion unit 306 on the information processing apparatus 101 receive receives a redirect request, the conversion unit 306 requests the authentication/permission processing unit 311 to obtain the authentication/permission (step S416). The authentication/permission processing unit 311 accesses an access permission screen on the access permission apparatus 107 according to the HTTP response (redirect request) (step S417). Here, the user does not log in to the access permission apparatus 107 (the user support service of the device manufacturer) and the authentication/permission processing unit 311 is further redirected to a user authentication screen (step S418). The authentication/permission processing unit 311 displays the user authentication screen in a pop-up manner via the program execution unit 302. When the user inputs a user account and a password on the access permission apparatus 107 (the user support service of the device manufacturer) and presses an OK button (step S419), the authentication/permission processing unit 311 transmits an authentication request message to the access permission apparatus 107 (step S420) and receives an authentication result (step S421). The received authentication result is the access permission screen which the authentication/permission processing unit 311 requested to access first. The authentication/permission processing unit 311 displays the access permission screen in a pop-up manner. In this screen, for example, a message such as "Electronic program guide service X requests to make a recording reservation on digital TV Y. Do you approve the request? [OK] [NG]" is displayed. Here, if the user presses the OK button (step S422), the authentication/permission processing unit 311 transmits an access authentication request message (step S423) and receives a response from the access permission apparatus 107 (step S424). The response message requests redirect to the callback URL specified by the resource providing apparatus 104 in step S415 (HTTP/1.1 302 Found). The response message includes ticket information indicating the access permission (or Verification Code for acquiring the ticket information). In the present embodiment, it is assumed that the response message includes the ticket information. However, if the response message includes the Verification Code, it is possible to present the Verification Code to the access permission apparatus 107 using a secure communication path such as HTTPS and acquire the ticket. At this time, the authentication/permission processing unit 311 may present that the authentication/permission processing unit 311 has a right to obtain access permission to the access permission apparatus 107 by using the license information stored in the device information storage 305.

The authentication/permission processing unit 311 transmits a request to the callback URL (that is, a Web API call to use a resource) (step S425). The request message includes ticket information in addition to access request source information. The ticket information may be configured to include a hash value of confidential information that verifies validity of the ticket along with character string data representing the ticket.

Here, the access control unit 404 on the resource providing apparatus 104 extracts the access request source information and the ticket information included in the received resource usage request. At this point, if the ticket information is not stored in the access request source information storage 403, the access control unit 404 requests the approval result verification unit 405 to verify the validity of the acquired ticket. The approval result verification unit 405 transmits a request message of the access permission result of a corresponding device to the access permission apparatus 107 via the information processing apparatus 101 (step S426). When the resource providing apparatus 104 is located on the network 201, the approval result verification unit 405 directly transmits the request message to the access permission apparatus 107. The access permission apparatus 107 receives the request and returns approval result information of the resource providing apparatus of the request source (step S427). When the same ticket as that received in step S425 is included in the returned approval result information, the approval result verification unit 405 determines that the ticket is valid and returns a response accordingly to the access control unit 404 (step S428) and stores information related to the permission (attribute information listed in FIG. 9) in the access request source information storage 403. The access control unit 404 approves the access on the basis of the response and the resource providing unit 402 provides a resource to be accessed (steps S429 and S430).

Thereafter, the conversion unit 306 calls the conversion code stored in the device information storage 305 corresponding to the resource usage request processing result and returns the conversion code (conversion result) to a program executed on the program execution unit 302, and then the program displays the result on the screen (step S431, step S432).

As described above, according to the present embodiment, in addition to the effect described in the third embodiment, there is an effect that the resource providing apparatuses 104 and 105 can perform access control according to the access request source (program providing apparatus 102). Further, it is possible to perform access control not only on the resource providing apparatuses, but also on the basis of an access permission using an external access permission service. Furthermore, the series of authentication/permission processes are executed as internal processes of a call of a common API in the same manner as in the first to the third embodiments, so that the program providing apparatus 102 cannot detect what authentication/permission processes are performed when using a resource. In other words, the program providing apparatus 102 cannot know the information of the user account and the password inputted by the user in the present embodiment. Therefore, even when an individual device requires user authentication and permission by using an external authentication/permission service, it is possible to realize use of resource (mash-up service between Web contents and a home appliance resource) without disclosing user's confidential information related to these processes to the program.

In the present embodiment, each resource providing apparatus provides conversion processing, so that it is possible to perform more flexible and complex processing, which is not limited by a static mapping based on a simple conversion table. Further, the program may be disposed not only on the resource providing apparatus, but also on a site of the manufacturer of the resource providing apparatus, so that there is an advantage that the program can be easily deployed and easily changed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus including a hardware processor, comprising:
 a communication unit to communicate with a program providing apparatus and communicate with a resource providing apparatus via a network, respectively, the communication unit receiving a program that includes a usage request to use a resource which the program providing apparatus provides, wherein the usage request is described in a first format and does not include an identity of the resource providing apparatus which provides the resource requested by the usage request;
 a program execution unit to execute the program;
 a conversion unit to identify the resource providing apparatus which provides the resource based on the usage request and data representing at least association between the usage request and a device an identifier of the resource providing apparatus and convert the usage request described in the first format into a usage request described in a second format that can be interpreted by the resource providing apparatus identified, and
 wherein the communication unit transmits the usage request in the second format to the resource providing apparatus.

2. The apparatus according to claim 1, further comprising:
 a user interface; and
 a device selection unit configured to cause a user to select a resource providing apparatus via the user interface when there are a plurality of resource providing apparatuses which provides the resource,
wherein the conversion unit identifies the resource providing apparatus selected by the user.

3. The apparatus according to claim 2, wherein
the plurality of resource providing apparatuses correspond to different formats respectively as the second format, and
the conversion unit converts the first format into one of the different formats that can be interpreted by the identified resource providing apparatus.

4. The apparatus according to claim 1, further comprising:
a device information acquisition unit configured to discover a resource providing apparatus being present on the network and acquire device information of the resource providing apparatus; and
a device information storage configured to store the device information acquired by the device information acquisition unit,
wherein the resource providing apparatus is identified on the basis of the device information.

5. The apparatus according to claim 4, wherein
the device information storage stores protocol information of the resource providing apparatus, and
the device information acquisition unit collects the device information based on the protocol information.

6. The apparatus according to claim 4, further comprising:
a user approval unit configured to obtain an approval from a user for an access to the device information,
wherein the conversion unit accesses the device information only when the approval is obtained from the user.

7. The apparatus according to claim 1, further comprising:
a user approval unit configured to obtain an approval from a user for access to the resource providing apparatus,
wherein the conversion unit transmits the usage request of the resource to the resource providing apparatus only when the approval is obtained from the user.

8. The apparatus according to claim 1, further comprising:
a device information storage to store an authentication/permission method and authentication information each being required to use the resource provided by the resource providing apparatus: and
an authentication/permission processing unit configured to perform authentication/permission processing with the resource providing apparatus in accordance with the authentication/permission method and the authentication information.

9. The apparatus according to claim 8, wherein
the authentication/permission processing unit inquires of a user whether or not the user approves use of the resource by the program providing apparatus and notifies the resource providing apparatus of a result of the inquiry.

10. The apparatus according to claim 1, wherein
the information processing apparatus is connected to the program providing apparatus via a first network and connected to the resource providing apparatus via a second network different from the first network,
the communication unit includes a first communication unit and a second communication unit,
the first communication unit communicates with the program providing apparatus via the first network, and
the second communication unit communicates with the resource providing apparatus via the second network.

11. The apparatus according to claim 1, further comprising:
a resource providing apparatus start-up unit configured to start up the resource providing apparatus by transmitting a remote start-up communication message when a transmission of the usage request of the resource to the resource providing apparatus fails.

12. The apparatus according to claim 1, wherein
the conversion unit converts the usage request based upon data defining a conversion mechanism between the first format and the second format,
the conversion mechanism is a conversion rule that defines a conversion method between the first format and the second format, and
the conversion unit converts the usage request according to the conversion rule.

13. The apparatus according to claim 1, wherein
the conversion unit converts the usage request based upon data defining a conversion mechanism between the first format and the second format,
the conversion mechanism is a program including instruction codes to convert between the first format and the second format, and
the conversion unit converts the usage request by reading and executing the program from the device information storage.

14. The apparatus according to claim 13, wherein
the communication unit receives the program from the resource providing apparatus or an external server, and
the device information storage stores the program received by the communication unit.

15. The apparatus according to claim 1, further comprising:
a discovering unit to discover at least one resource providing apparatus that provides a resource being possibly used by a usage request, and associate the usage request with the resource providing apparatus discovered, to obtain the data representing the association.

16. The apparatus according to claim 1, wherein
the conversion unit displays a user interface at least one time to obtain an approval from a user to use the resource providing apparatus.

17. The apparatus according to claim 1, wherein
the conversion unit specifies one of one or more resource providing apparatus which provides the resource used by the usage request, based on the identifier of the one resource providing apparatus.

18. The apparatus according to claim 17, wherein
the resource providing apparatus which provides the resource used by the usage request is connected to IP (Internet Protocol)-based local area network.

19. The apparatus according to claim 1,
the communication unit receives a processing result of the usage request in the second format from the resource providing apparatus,
the conversion unit converts the processing result in the second format into a processing result in the first format, and
the program execution unit performs an operation according to the processing result in the first format.

20. An information processing method performed in a computer including a hardware processor, comprising:
communicating with a program providing apparatus and communicating with a resource providing apparatus via a network, respectively,
receiving a program that includes a usage request to use a resource which the program providing apparatus provides, wherein the usage request is described in a first format and does not include an identity of the resource providing apparatus which provides the resource requested by the usage request;

executing the program;

identifying the resource providing apparatus which provides the resource, based on the usage request and data representing at least association between the usage request and an identifier of the resource providing apparatus and converting the usage request described in the first format into a usage request described in a second format that can be interpreted by the resource providing apparatus identified, and transmitting the usage request in the second format to the resource providing apparatus.

21. An information processing method performed in a computer including a hardware processor, comprising:

communicating with a program providing apparatus and communicating with a resource providing apparatus via a network, respectively, receiving a program that includes a usage request to use a resource which the program providing apparatus provides, wherein the usage request is described in a first format and does not include an identity of the resource providing apparatus which provides the resource requested by the usage request;

executing the program;

identifying the resource providing apparatus which provides the resource, based on the usage request and data representing at least association between the usage request and an identifier of the resource providing apparatus and converting the usage request described in the first format into a usage request described in a second format that can be interpreted by the resource providing apparatus identified, and transmitting the usage request in the second format to the resource providing apparatus.

* * * * *